US012684043B2

(12) United States Patent 
Teng et al.

(10) Patent No.: US 12,684,043 B2 
(45) Date of Patent: Jul. 14, 2026

(54) ON-DEVICE PERSONALIZATION BASED ON CONTINUAL LOCAL USER CONTEXT LEARNING

(71) Applicant: QUALCOMM Incorporated, San Diego, CA (US)

(72) Inventors: Diyan Teng, Sunnyvale, CA (US); Mehul Soman, San Jose, CA (US); Andrea Rossi, Cork (IE); Emanuele Cosenza, Cork (IE); Nauman Shahid, Cork (IE); Rashmi Kulkarni, Redwood City, CA (US); Justin McGloin, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 18/926,192

(22) Filed: Oct. 24, 2024

(65) Prior Publication Data

US 2026/0122141 A1 Apr. 30, 2026

(51) Int. Cl.
*G06F 15/16* (2006.01)
*G06N 5/04* (2023.01)
*H04L 67/306* (2022.01)

(52) U.S. Cl.
CPC .............. H04L 67/306 (2013.01); G06N 5/04 (2013.01)

(58) Field of Classification Search
CPC ................................. H04L 67/203; G06N 5/04
USPC .......................................................... 709/203
See application file for complete search history.

(56) References Cited

U.S. PATENT DOCUMENTS

| | | | | |
|---|---|---|---|---|
| 9,693,724 B2* | 7/2017 | Dagum | ................. | A61B 5/163 |
| 9,983,775 B2* | 5/2018 | Jain | ......................... | G06F 9/451 |
| 10,360,495 B2* | 7/2019 | Chapela | ................. | G06T 11/26 |
| 11,423,281 B2* | 8/2022 | De Magalhaes | ....... | G06N 20/00 |
| 11,544,591 B2* | 1/2023 | Paulina | ................. | G16H 20/70 |
| 11,720,808 B2* | 8/2023 | Chang | ..................... | G06N 5/04 |
| | | | | 706/12 |
| 12,150,791 B2* | 11/2024 | Kaleal, III | ............. | G16H 20/30 |
| 12,245,129 B2* | 3/2025 | Gulati | .................... | G06N 20/00 |
| 12,318,181 B2* | 6/2025 | Sunor | ................. | A61B 5/7267 |
| 2015/0156623 A1 | 6/2015 | Pennanen | | |
| 2017/0039480 A1* | 2/2017 | Bitran | ...................... | A61B 5/01 |
| 2017/0329933 A1* | 11/2017 | Brust | ............... | G06F 16/24575 |
| 2021/0004705 A1* | 1/2021 | Kim | ......................... | G06N 3/09 |
| 2023/0030053 A1* | 2/2023 | Itohara | .................. | G06Q 10/06 |

(Continued)

OTHER PUBLICATIONS

International Search Report and Written Opinion PCT/US2025/044078 ISA/EPO Oct. 29, 2025.

*Primary Examiner* — Moustafa M Meky
(74) *Attorney, Agent, or Firm* — Polsinelli LLP

(57) ABSTRACT

Various embodiments provide methods performed by a user equipment (UE) including receiving sensor data associated with activity of a user from a plurality of inputs at a first-time instance, determining a state of the user at the first-time instance based on the sensor data, and identifying, by the processor, at least one attribute of the user or the activity of the user based on the sensor data and the state of the user collected at multiple time instances including the first-time instance. Identifying the at least one attribute may use an inference model to receive selected sensor data as an input and to provide an output classifying the state of the user at the multiple time instances as an attribute of the user.

20 Claims, 17 Drawing Sheets

(56)                    References Cited

U.S. PATENT DOCUMENTS

| | | | |
|---|---|---|---|
| 2023/0153628 A1 | 5/2023 | Hernandez et al. | |
| 2023/0411008 A1* | 12/2023 | Khanzada | G16H 10/65 |
| 2024/0086761 A1* | 3/2024 | Patel | A61B 5/165 |
| 2024/0127057 A1* | 4/2024 | Spathis | G06N 3/09 |

* cited by examiner

300

Computing Device 302

| Sensor(s) 314 | Electronic Storage 312 | Transceiver 316 |

Processor(s) 310

Machine-Readable Instructions 320

PKG Component 322

Query Engine 324

User Settings Component 326

Accuracy Component 328

110

121

Communication Network 308

330

332

127a

306

127b

304

115

145

130

500

UE Sensors ——115

Context Processing ——415

——223
Context Database

——194
Classification Model

Input Context ——515

——168
Embedding Model

Down-Stream Attr. Classifier 525a

Down-Stream Attr. Classifier 525b

Down-Stream Attr. Classifier 525c

I/O 545

532—— User Input

Context Sharing

OEM Detection

——534

——536

600

610

Weight Fusion Component

Classification Model 194

Input Context
515a

Self-Training
620a

Embedding Model 168

Downstream Attr. Classifier 525a

Classification Model 194

Input Context
515b

Self-Training
620b

Embedding Model 168

Downstream Attr. Classifier 525b

Classification Model 194

Input Context
515c

Self-Training
620c

Embedding Model 168

Downstream Attr. Classifier 525c

630

Weight Redistribution Component

Synthetic Data Generator

765

705

Query 1

715

Profile Log

725

Query 2

LLM

735

Activity Logs

745

Query 3

755

Context Logs

1100

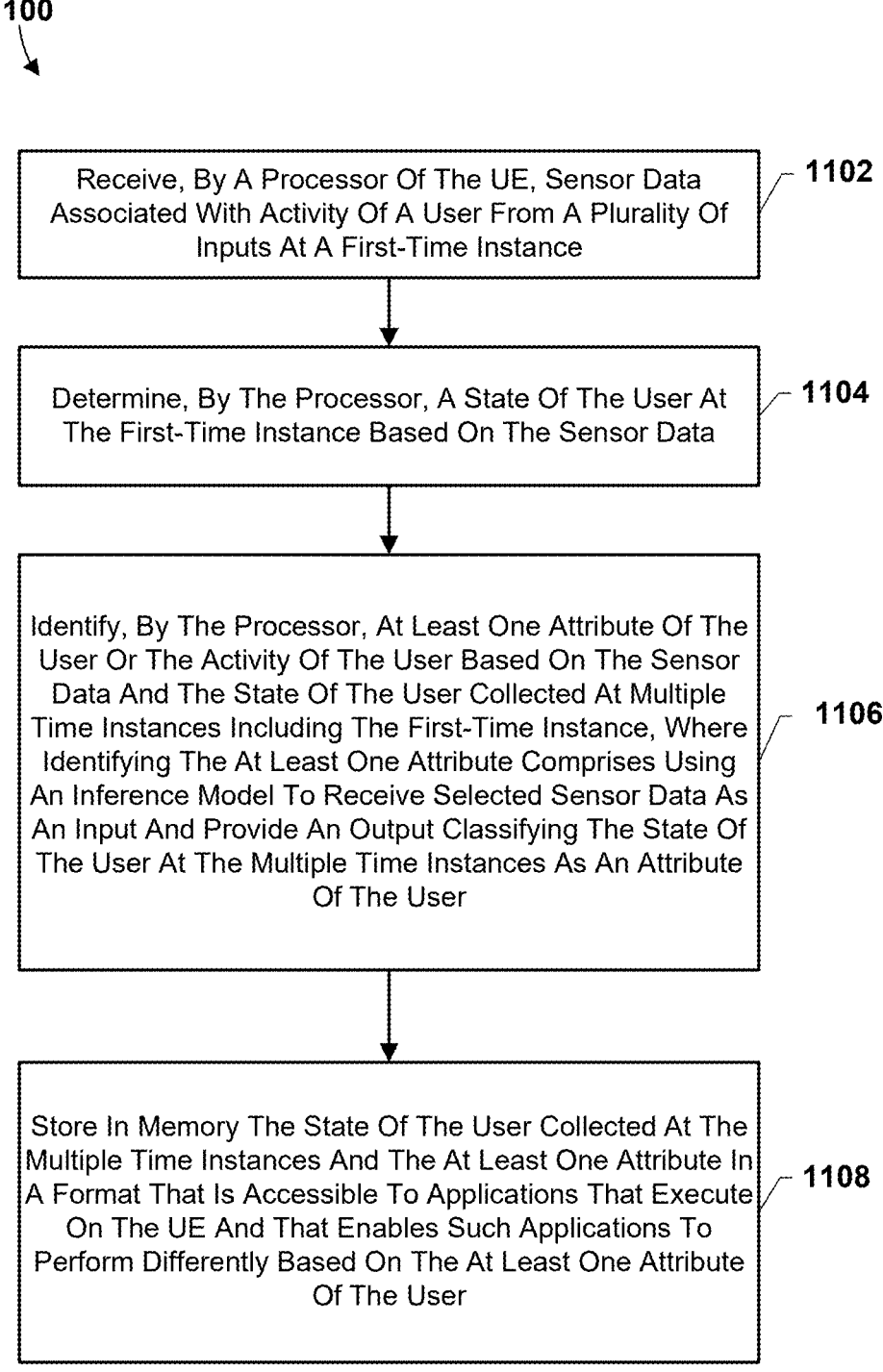

Receive, By A Processor Of The UE, Sensor Data Associated With Activity Of A User From A Plurality Of Inputs At A First-Time Instance

1102

Determine, By The Processor, A State Of The User At The First-Time Instance Based On The Sensor Data

1104

Identify, By The Processor, At Least One Attribute Of The User Or The Activity Of The User Based On The Sensor Data And The State Of The User Collected At Multiple Time Instances Including The First-Time Instance, Where Identifying The At Least One Attribute Comprises Using An Inference Model To Receive Selected Sensor Data As An Input And Provide An Output Classifying The State Of The User At The Multiple Time Instances As An Attribute Of The User

1106

Store In Memory The State Of The User Collected At The Multiple Time Instances And The At Least One Attribute In A Format That Is Accessible To Applications That Execute On The UE And That Enables Such Applications To Perform Differently Based On The At Least One Attribute Of The User

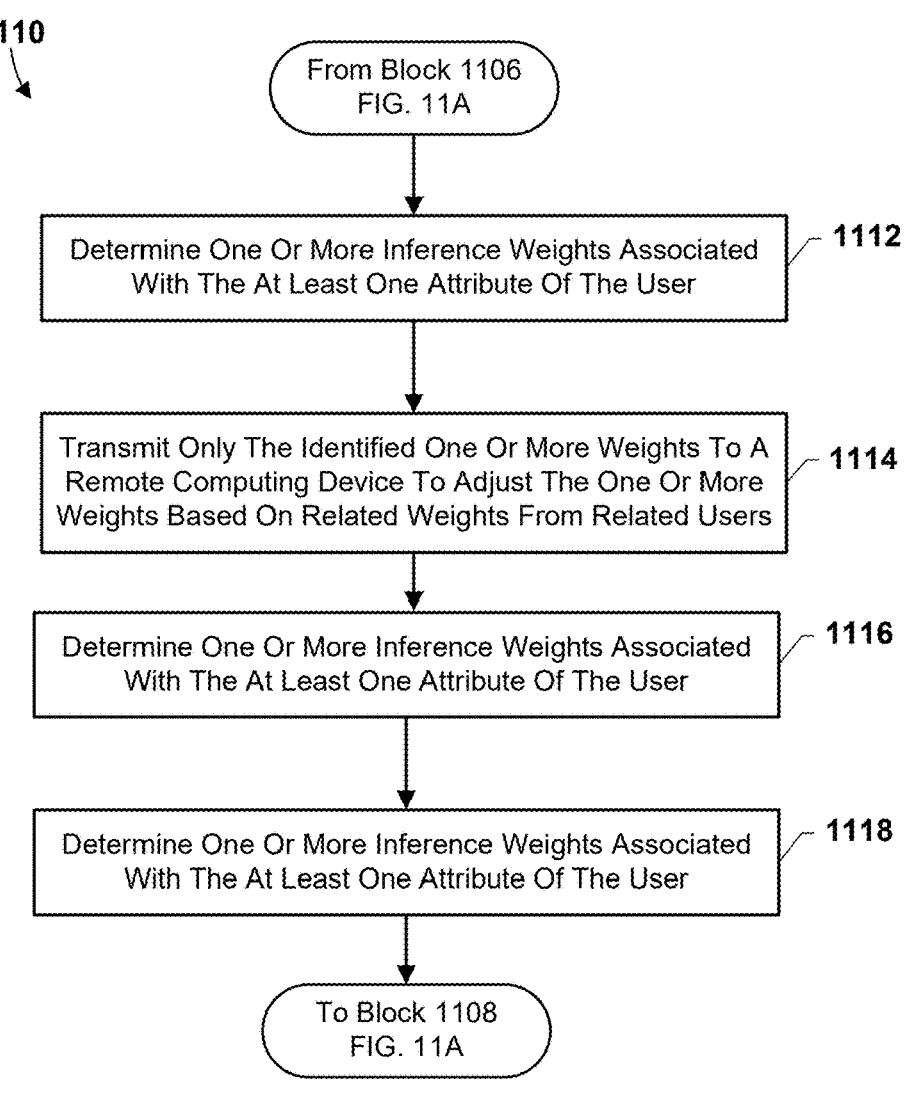

From Block 1106
FIG. 11A

Determine One Or More Inference Weights Associated With The At Least One Attribute Of The User — 1112

Transmit Only The Identified One Or More Weights To A Remote Computing Device To Adjust The One Or More Weights Based On Related Weights From Related Users — 1114

Determine One Or More Inference Weights Associated With The At Least One Attribute Of The User — 1116

Determine One Or More Inference Weights Associated With The At Least One Attribute Of The User — 1118

To Block 1108
FIG. 11A

From Block 1108
FIG. 11A

Update The Inference Model In An On-Device Retraining, In Which The On-Device Retraining Is Based At Least In Part On The State Dictionary Including The First Unknown State — 1112

FIG. 11C

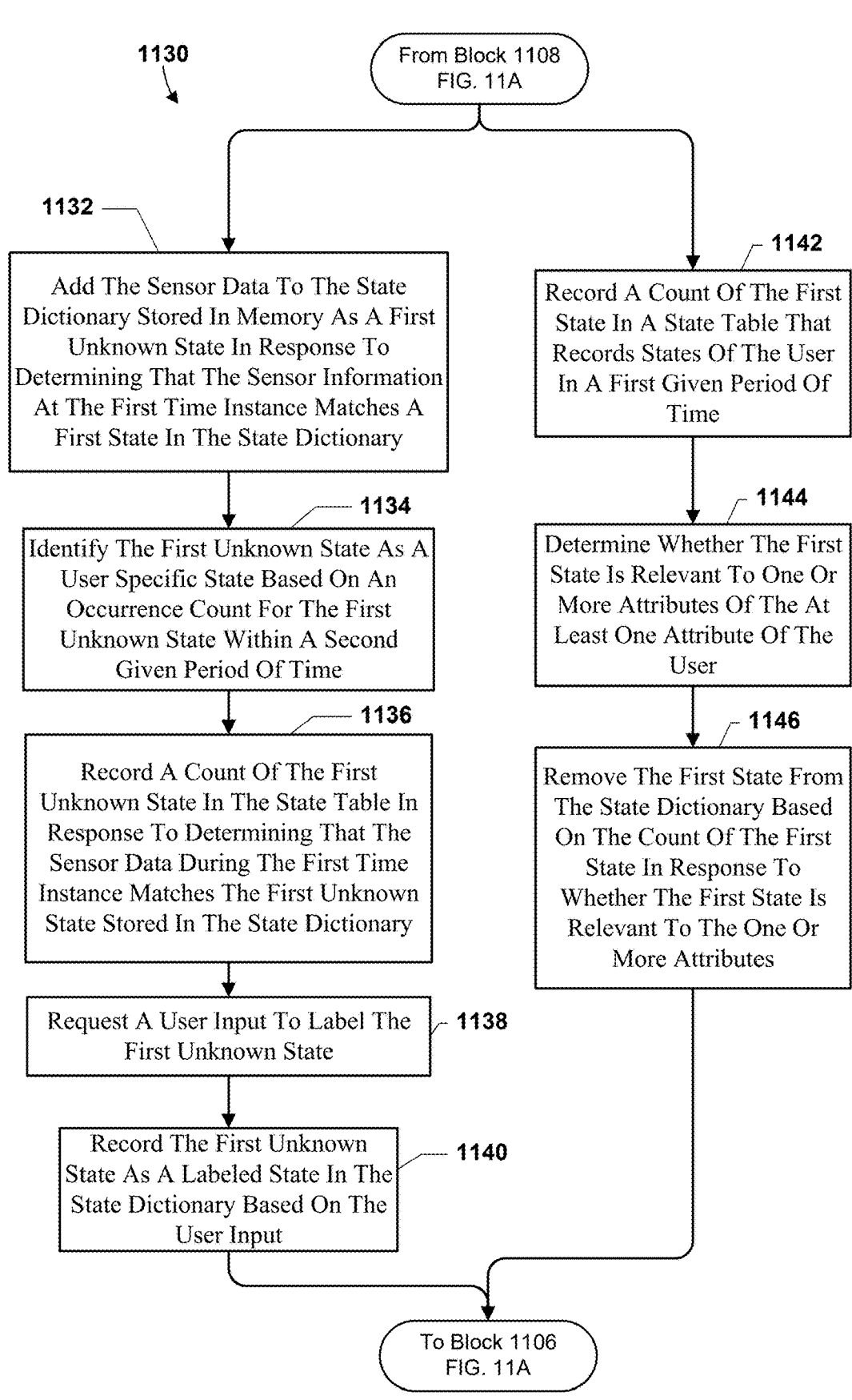

1130

From Block 1108
FIG. 11A

1132

Add The Sensor Data To The State Dictionary Stored In Memory As A First Unknown State In Response To Determining That The Sensor Information At The First Time Instance Matches A First State In The State Dictionary

1134

Identify The First Unknown State As A User Specific State Based On An Occurrence Count For The First Unknown State Within A Second Given Period Of Time

1136

Record A Count Of The First Unknown State In The State Table In Response To Determining That The Sensor Data During The First Time Instance Matches The First Unknown State Stored In The State Dictionary

1138

Request A User Input To Label The First Unknown State

1140

Record The First Unknown State As A Labeled State In The State Dictionary Based On The User Input

1142

Record A Count Of The First State In A State Table That Records States Of The User In A First Given Period Of Time

1144

Determine Whether The First State Is Relevant To One Or More Attributes Of The At Least One Attribute Of The User

1146

Remove The First State From The State Dictionary Based On The Count Of The First State In Response To Whether The First State Is Relevant To The One Or More Attributes To Block 1106
FIG. 11A

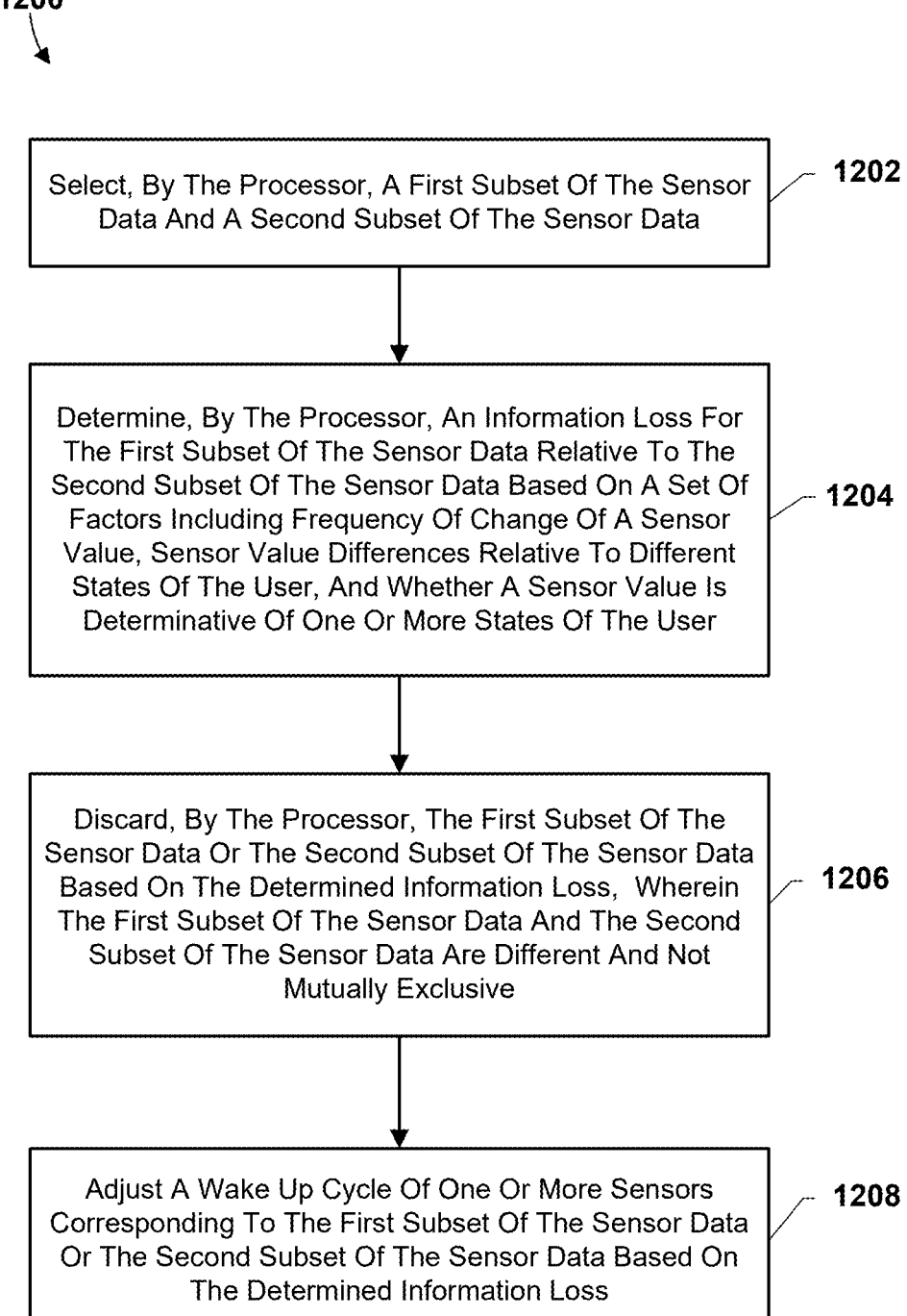

Select, By The Processor, A First Subset Of The Sensor Data And A Second Subset Of The Sensor Data ⟋ 1202

Determine, By The Processor, An Information Loss For The First Subset Of The Sensor Data Relative To The Second Subset Of The Sensor Data Based On A Set Of Factors Including Frequency Of Change Of A Sensor Value, Sensor Value Differences Relative To Different States Of The User, And Whether A Sensor Value Is Determinative Of One Or More States Of The User ⟋ 1204

Discard, By The Processor, The First Subset Of The Sensor Data Or The Second Subset Of The Sensor Data Based On The Determined Information Loss, Wherein The First Subset Of The Sensor Data And The Second Subset Of The Sensor Data Are Different And Not Mutually Exclusive ⟋ 1206

Adjust A Wake Up Cycle Of One Or More Sensors Corresponding To The First Subset Of The Sensor Data Or The Second Subset Of The Sensor Data Based On The Determined Information Loss ⟋ 1208

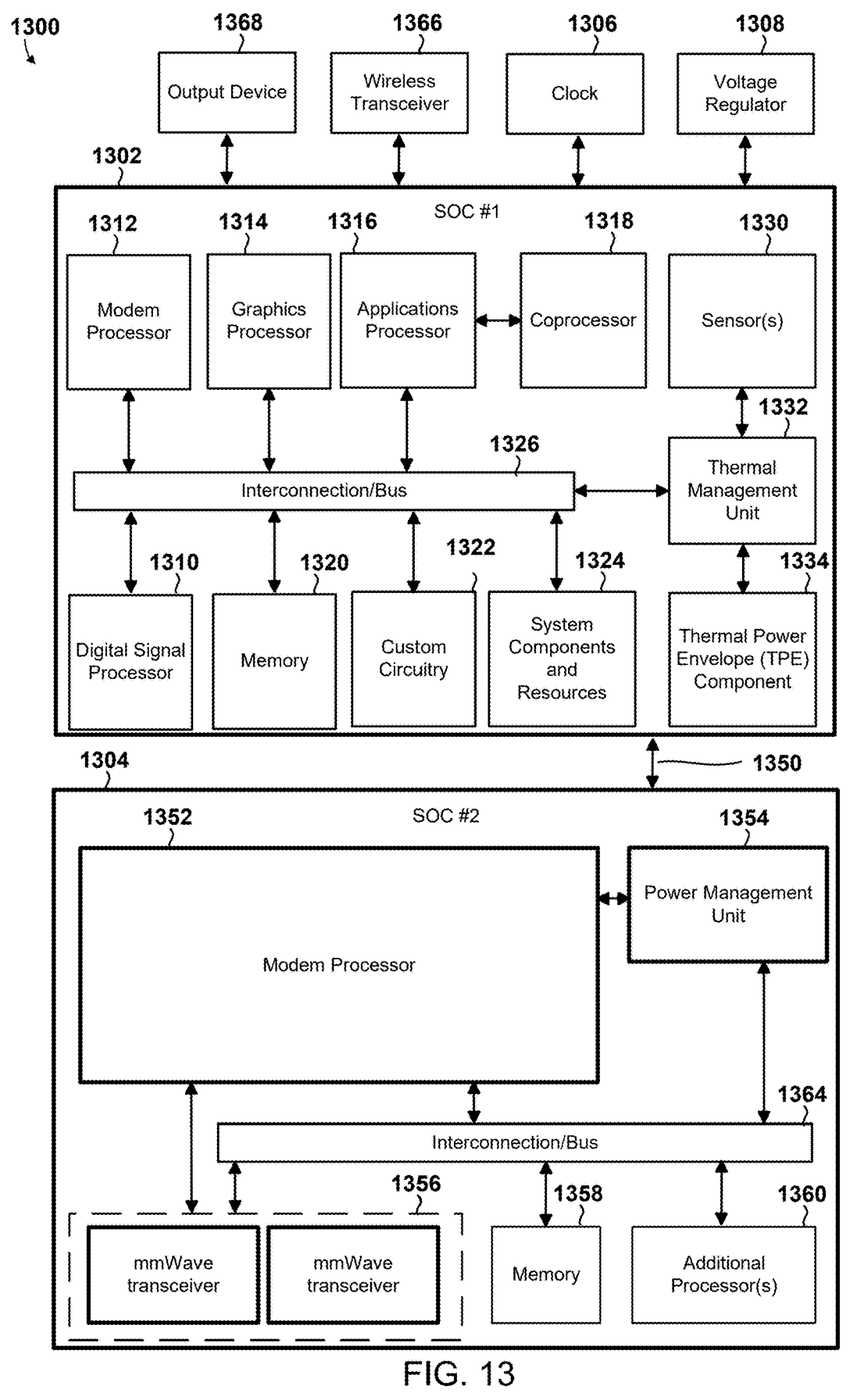

Output Device

1366

Wireless Transceiver

1306

Clock

1308

Voltage Regulator

1302

SOC #1

1312

Modem Processor

1314

Graphics Processor

1316

Applications Processor

1318

Coprocessor

1330

Sensor(s)

1326

Interconnection/Bus

1332

Thermal Management Unit

1310

Digital Signal Processor

1320

Memory

1322

Custom Circuitry

1324

System Components and Resources

1334

Thermal Power Envelope (TPE) Component

1304

1350

SOC #2

1352

Modem Processor

1354

Power Management Unit

1364

Interconnection/Bus

1356 mmWave transceiver mmWave transceiver

1358

Memory

1360

Additional Processor(s)

FIG. 13

ON-DEVICE PERSONALIZATION BASED ON CONTINUAL LOCAL USER CONTEXT LEARNING

BACKGROUND

User equipment, such as smartphones, now includes many features and sensors that collect information about users. Data collected by user equipment has been used in various ways. Some of the collected data may be accessible to applications on the smartphone if users allow such access. This collected information can quickly become too large to store on the user equipment. Therefore, the amount of data that is kept may be limited, often to only the most recent data.

SUMMARY

Various aspects include systems and methods performed by a processor of a user equipment (UE) for performing on-device personalization of the operation of the user device. Various aspects may include receiving, by a processor of the UE, sensor data associated with activities of a user from a plurality of inputs at a first-time instance, determining, by the processor, a state of the user at the first-time instance based on the sensor data, identifying, by the processor, at least one attribute of the user or the activity of the user based on the sensor data and the state of the user collected at multiple time instances including the first-time instance, in which identifying the at least one attribute includes using an inference model to receive selected sensor data as an input and to provide an output classifying the state of the user at the multiple time instances as an attribute of the user, and storing in memory the state of the user collected at the multiple time instances and the at least one attribute in a format that is accessible to applications that execute on the UE and that enables such applications to perform differently based on the at least one attribute of the user.

Some aspects may further include selecting, by the processor, a first subset of the sensor data and a second subset of the sensor data, determining, by the processor, an information loss for the first subset of the sensor data relative to the second subset of the sensor data based on a set of factors including frequency of change of a sensor value, sensor value differences relative to different states of the user, and whether a sensor value is determinative of one or more states of the user, and discarding, by the processor, the first subset of the sensor data or the second subset of the sensor data based on the determined information loss, in which the first subset of the sensor data and the second subset of the sensor data are different and not mutually exclusive.

Some aspects may further include determining, by the processor, whether a predetermined balance between the determined information loss and a power cost of receiving the sensor data from the plurality of inputs is satisfied, determining, by the processor, whether a user setting limits receipt of the sensor data from one or more of the plurality of inputs, and adjusting, by the processor, a wake-up cycle of one or more sensors corresponding to the first subset of the sensor data or the second subset of the sensor data based on the predetermined balance and the user setting.

In some aspects, selecting the first subset of the sensor data may be performed randomly by activating a random subset of the plurality of inputs or selecting the second subset of the sensor data may be performed randomly by de-activating a test input of the plurality of inputs. In some aspects, the first subset of the sensor data may relate to the plurality of inputs and the second subset of the sensor data may relate to the plurality of inputs excluding a test input of the plurality of inputs. In some aspects, selecting the second subset of the sensor data may include periodically de-activating a first input of the plurality of inputs thereby reducing a resolution of the sensor data from the first input.

In some aspects, determining a state of the user may include matching, by the processor, the sensor data at the first-time instance with the state based on a state dictionary, where the state dictionary includes a set of valid states of user context. In some aspects, the method and system may include determining whether the first state is relevant to one or more attributes of the at least one attribute of the user, and removing the first state from the state dictionary based on the count of the first state in response to whether the first state is relevant to the one or more attributes.

In some aspects, determining a state of the user may include determining, by the processor, whether the sensor data at the first-time instance matches a first state in a state dictionary, and may include either adding, by the processor, the sensor data to the state dictionary stored in memory as a first unknown state in response to determining that the sensor data at the first-time instance matches a first state in the state dictionary, or recording, by the processor, a count of the first state in a state table that records states of the user in a first given period of time. In some aspects, the first unknown state may be added the state dictionary stored in memory, and aspect methods may include identifying the first unknown state as a user specific state based on an occurrence count for the first unknown state within a second given period of time, requesting, via the UE, a user input to label the first unknown state, and recording the first unknown state as a labeled state in the state dictionary based on the user input. Some aspects may further include recording, by the processor, a count of the first unknown state in the state table in response to determining that the sensor data during the first-time instance matches the first unknown state stored in the state dictionary. Some aspects may further include updating the inference model in an on-device retraining performed by the UE, in which the on-device retraining may be based at least in part on the state dictionary including the first unknown state.

Some aspects may further include determining one or more inference weights associated with the at least one attribute of the user, transmitting only the one or more weights to a remote computing device to adjust the one or more weights based on related weights from related users, where users are related based at least on geolocation, receiving one or more adjusted weights, and updating the inference model of the UE based on the one or more adjusted weights.

Some aspects may further include training the inference model by querying an artificial intelligence (AI) model to complete a user profile based on a set of user profile fields, querying the AI model to complete user activity in a given time period based on the completed user profile, querying the AI model to complete context logs of synthetic sensor data associated with the user activity, assembling the responses to the queries into a training dataset, and using the training dataset to derive weighting parameters associated with the inference model. Some aspects may further include training the inference model based on the training dataset and the sensor data by one of mixing the sensor data into the training dataset, upsampling the training dataset using the sensor data, or querying the AI model to fill gaps in the sensor data based on the user profile.

In some aspects, storing in the memory the state of the user collected at the multiple time instances and the at least one attribute may further include storing the state of the user collected at the multiple time instances and the at least one attribute in a personal knowledge graph that is accessible to applications that execute on the UE and that enables such applications to perform differently based on the at least one attribute of the user.

Further aspects include UE having one or more processors configured to perform operations of any of the methods summarized above. Further aspects include processing devices for use in a UE configured with processor-executable instructions to perform operations of any of the methods summarized above. Further aspects include a non-transitory processor-readable storage medium having stored thereon processor-executable instructions configured to cause a processor of a UE to perform operations of any of the methods summarized above. Further aspects include a UE having means for performing functions of any of the methods summarized above.

BRIEF DESCRIPTION OF THE DRAWINGS

FIG. 6 is a flow diagram illustrating a model training flow suitable to implement various embodiments.

FIGS. 11A-11D are process flow diagrams illustrating example processes suitable for implementing some embodiments.

FIG. 12 is a process flow diagram illustrating an example process suitable for implementing some embodiments.

FIG. 13 is a component block diagram of connected processors suitable for implementing various embodiments.

DETAILED DESCRIPTION

Figure 1A:
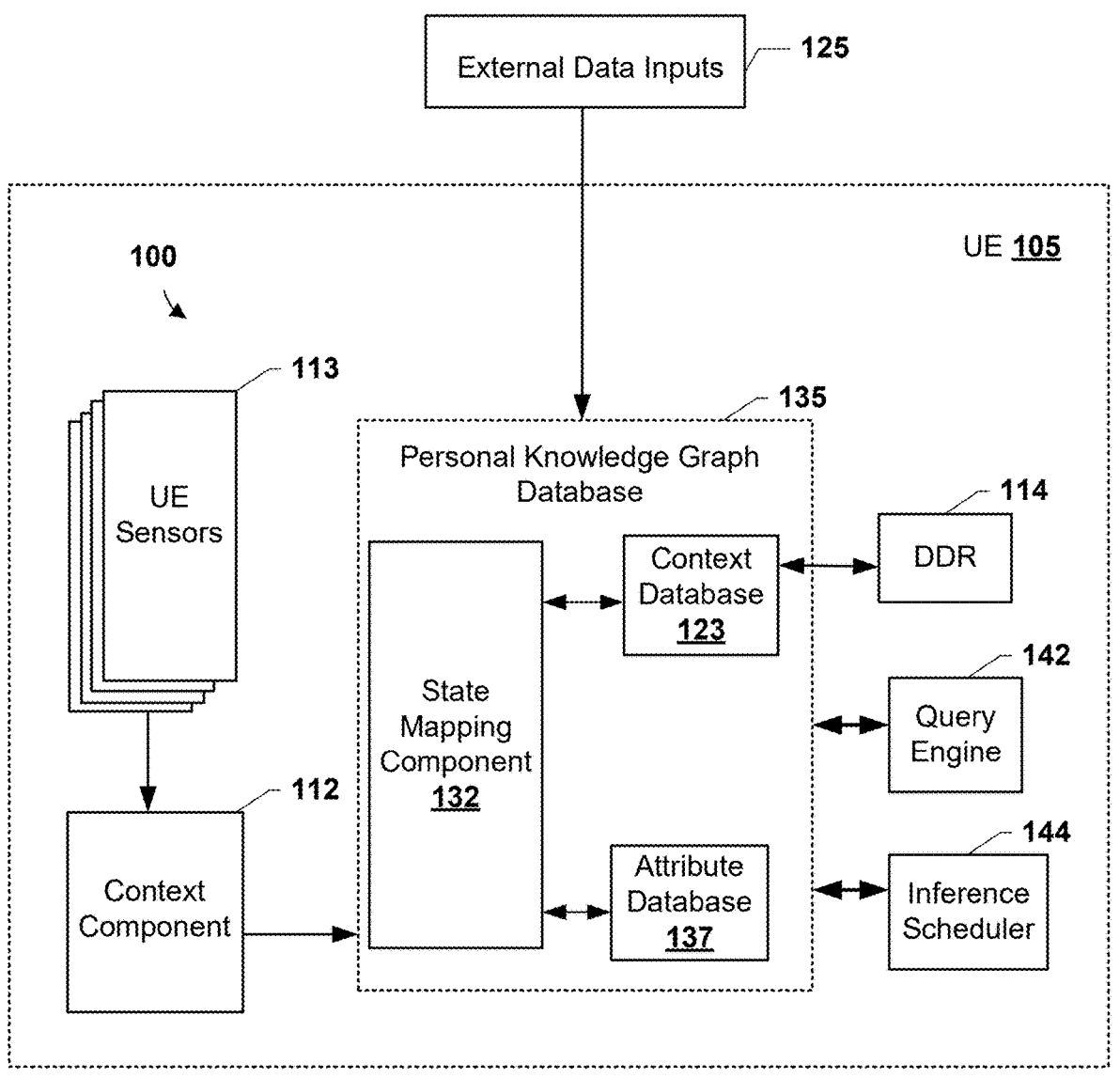
FIG. 1A is a system block diagram illustrating an example UE system suitable for implementing various embodiments.

Various embodiments and implementations will be described in detail with reference to the accompanying drawings. Wherever possible, the same reference numbers will be used throughout the drawings to refer to the same or like parts. References made to particular examples and embodiments are for illustrative purposes and are not intended to limit the scope of the claims.

Various embodiments include systems and methods for gathering user activity data via sensors and for quickly characterizing the activity for use by various applications while enabling the sensor data to be deleted. Various embodiments include selecting sensors or sensor data that best characterizes one or more activities by switching one or more sensors off and identifying an information loss due to the sensor being disabled. Various embodiments also include methods that may be implemented in a remote server or edge server for assisting a mobile computing device in characterizing user activity and user attributes. Various embodiments may learn over time, via one or more inference models, a user's demographics, habits, and interests and summarize key attributes to enhance downstream applications via personalization.

The term "user equipment" (UE) is used herein to refer to any one or all of wireless communication devices, wireless appliances, cellular telephones, smartphones, portable computing devices, personal or mobile multi-media players, laptop computers, tablet computers, smartbooks, ultrabooks, palmtop computers, wireless electronic mail receivers, virtual reality displays, extended reality displays, multimedia Internet-enabled cellular telephones, wireless router devices, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC may also include any number of general-purpose or specialized processors (digital signal processors, modem processors, video processors, etc.), memory blocks (such as ROM, RAM, Flash, etc.), and resources (such as timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores, or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP also may include multiple independent SOCs coupled together via high-speed communication circuitry and packaged in close proximity, such as on a single motherboard or in a single wireless device. The proximity of the SOCs facilitates high-speed communications and the sharing of memory and resources.

Personalization of content on mobile devices presently involves data collection and analysis of user behavior. When individuals use mobile apps, browse websites, or interact with social media, data is gathered about their preferences, location, search history, and app usage. This information is often collected through cookies, device identifiers, and other tracking technologies. Mobile platforms, such as Android and iOS, also gather data from app usage and in-app activities. This information may be used to build detailed remote user profiles, which are then used to deliver personalized content tailored to the user's interests, location, and online behavior. However, users have no way to use or apply these profiles to their devices or applications on their devices since these ad profiles are closely guarded secrets. As a result, users have largely been left out of the personalization revolution that their data has/can enable.

The data is processed through algorithms that determine which content is most relevant to each user. For example, if a user frequently searches for travel-related content or uses apps for booking flights, they are likely to see content for vacation deals or hotels. Content personalization may consider real-time factors, such as the user's current location or the time of day, to serve content that is more likely to be relevant in the moment, like a nearby restaurant offering during lunchtime. This tailored content aim to increase engagement, click-through rates, and conversions by providing content that is more aligned with the user's specific interests and needs. Because of the volume of data that can be collected from online activity and phone sensors, ad profiles of user data may be short lived and may cover only a few days of user activity. Furthermore, content placement may be correlated to user activity based on testing and click-through rates. Therefore, the user profiles often fail to identify the user's characteristics.

As described above, user devices and applications thereon do not automatically customize or automatically personalize for the user. Various aspects disclosed herein enable a user device to learn and adapt to each individual user based on data collected by the sensors on the user device. This may improve accessibility for the user or enhance the user experience.

To enable accurate characterizations of users, the user device or user equipment (UE) may gather relevant information over a long period of time. For example, some attributes of a user may only be detectable at particular times (e.g., a winter skier). Accordingly, the on-device personalization disclosed herein is adapted to be efficient in data collection such that sensor data relevance is continually being assessed. The on-device personalization may be continuously learning from real time data (or substantially real time data and context). The on-device personalization may characterize one or more states of the user based on the data collected and analyzed over various time periods.

Sensor data from a UE, such as accelerometers and gyroscopes, may be used to identify physical activities like walking, running, biking, or driving. These measurements may be analyzed by sensing algorithms to create a context-mapping process that interprets user activity. The outputs from these sensing algorithms may be tracked over different time periods, which can range from weekly to yearly. The collected data is then stored in a context database, where it can be used to characterize user behavior over time. That is, the identified activities may be stored and used to characterize the user for various on-device personalization.

Downstream inference models may use data from the context database to analyze user characteristics, such as physical activity or travel habits. For example, an inference model can determine how active a person is by analyzing their daily step count or determine that the person enjoys traveling based on the amount of time spent away from their home city. Together, these data points contribute to a detailed profile of the user's interests and behaviors, which may be called attributes. Once these attributes are identified, the user attributes may be shared with local applications or used by the UE to personalize operations and functions of the device. For example, the attributes may be shared with a large language model (LLM) that uses these attributes to improve its responses to queries by the user. Accordingly, on-device personalization may be performed based on the characteristics captured through the context database.

The context sensing algorithm may output tags of various sensor readings based on context from other sensors or one or more sensors over time. These tags may be consolidated and formatted in a state space mapping component that operates as a feature extractor. The state space mapping component may identify states, map activities to states, determine whether a user is in a particular state, or identify new states of the user. The state space mapping component may collect and manage tables of user states over time and store them in a context database of a personal knowledge graph (PKG).

Building a personal knowledge graph may require extensive data collection, involving millions of users' data over several years to accurately derive ground truth attributes and states. This process may include continuous logging of data, making it a highly data-intensive and resource-demanding task. Accordingly, various aspects described herein address issues arising from the need to handle and analyze vast amounts of data effectively, as well as how to source such information to identify a set of attributes and states.

The system and method may involve a UE that receives sensor data related to a user's activity from multiple inputs at a specific time. The UE processor may determine the user's state based on this sensor data. The processor may then identify at least one attribute of the user or their activity using an inference model, which classifies the user's state over multiple time instances. This information is stored in memory, making the information accessible to applications on the UE, allowing the applications and functions of the UE to perform differently based on the identified attributes.

The system and method may include selecting two subsets of the sensor data and determining the information loss for one subset relative to the other. The selecting may be based on factors such as the frequency of change of a sensor value, differences in sensor values relative to different user states, and whether a sensor value is determinative of user states. The UE processor may discard one of the subsets based on the determined information loss, with the subsets being different and not mutually exclusive.

FIG. 1A is a system block diagram illustrating an example UE system 100 suitable for implementing any of the various embodiments. A user equipment (UE) 105 may include various UE sensors 113 such as accelerometers, gyroscopes, global positioning satellite (GPS) sensors, light sensors, microphones, pressure sensors, temperature sensors, and other environmental sensors. UE sensors 113 may include action monitors connected to a graphical user interface (GUI) or other inputs of the UE that record the user's actions and interactions with applications. For example, the UE sensors may record a scroll speed in a reading application to determine reading speed.

UE sensors 113 may include one or more cameras (e.g., rear-facing and forward-facing) which may record video or other lighting factors (e.g., daylight sensor). The UE sensors 113 may include various post-processing components that analyze input from the cameras, such as the face of the user or guest users, eye tracking, gesture recognition, and other recognizable inputs. In some aspects, context algorithms of the context component 112 may perform post-processing of the UE sensors 113.

The context component 112 may perform processing of sensor inputs to generate context data, which is then used to understand user behaviors and environments. These processes or algorithms may work independently of other applications, analyzing data from various sensors to identify activities, locations, and environmental conditions. For instance, the context component 112 may determine whether a user is walking, running, or in a vehicle, and identify significant locations like home or work based on geofencing data (e.g., processing GPS data). The context component 112 may convert raw sensor data into context information, which may be in the form of tags or labels. The context component 112 may map and synthesize various sensor outputs (e.g., heart rate and speed to determine running as a mode of travel) to create a comprehensive context data stream that reflects the user's daily activities and environmental interactions.

The context component 112 may output the context information (e.g., activities) to the state mapping component 132. The mapping of the user contexts to various user states (e.g., transportation mode, motion type, phone usage, local time zone) may involve analyzing inputs from the context component 112 and the raw UE sensors 113 to identify which state or states may be appropriate for a user at a given period or set of periods (e.g., over the hour/day/week/year). For example, GPS sensor data and context information characterizing accelerometer and gyroscopic data as running may be identified by the state mapping component 132 as a transportation mode of walking and a motion type of running. The state mapping component 132 may correlate various context labels/tags as well as raw sensor data to a set of states. The set of states may be stored in a state table in the personal knowledge graph database 135, as described further with reference to FIG. 4.

The identified states may be stored in the context database 123 together with the tags that defined the state and a time stamp. That is, the identified state may be a series of tags, a state name, and a time stamp. This table of user states may be collected in the context database 123 over time. After various predetermined time periods, an inference engine may map one or more states to an attribute of the user (e.g., physically active, commuter). The attributes of the user constitute another data abstraction that is derived from the data of the prior abstraction: user states. The processing of a block (e.g., one month) of state table data in an inference engine (as described further in FIG. 1B) may generate one or more attributes of the user, which may be more abstract than states or activities.

The PKG database 135 or the context database 123 may then delete the processed block of user states to make room for more. The attributes of attribute database 137 may be updated periodically as the user changes (e.g., very physically active after the start of the new year). Various weights or criteria may limit attribute changes (e.g., with a threshold) so that the user has a predictable user experience on the UE 105. The PKG database 135 may connect to various inference engines (e.g., models) that may iteratively characterize the data stored in the PKG database in various forms (e.g., states, context, attributes). The PKG database 135 may connect to external data inputs 125 of the UE 105, including wearable devices, cloud accounts associated with the UE 105, and paired devices, for example. The external data inputs may provide additional sensor inputs or context inputs.

The PKG database 135 may connect to double data rate (DDR) memory 114 (e.g., random access memory—RAM) to provide state data and attribute data to applications for on-device personalization. The PKG database 135 may connect to the query engine 142, which may remotely query the PKG database 135 and to provide a query response to a remote requester. The PKG database 135 may connect to inference scheduler 144, which may be initiated remotely or by the user's request to update attributes at predetermined times or periods.

Figure 1B:
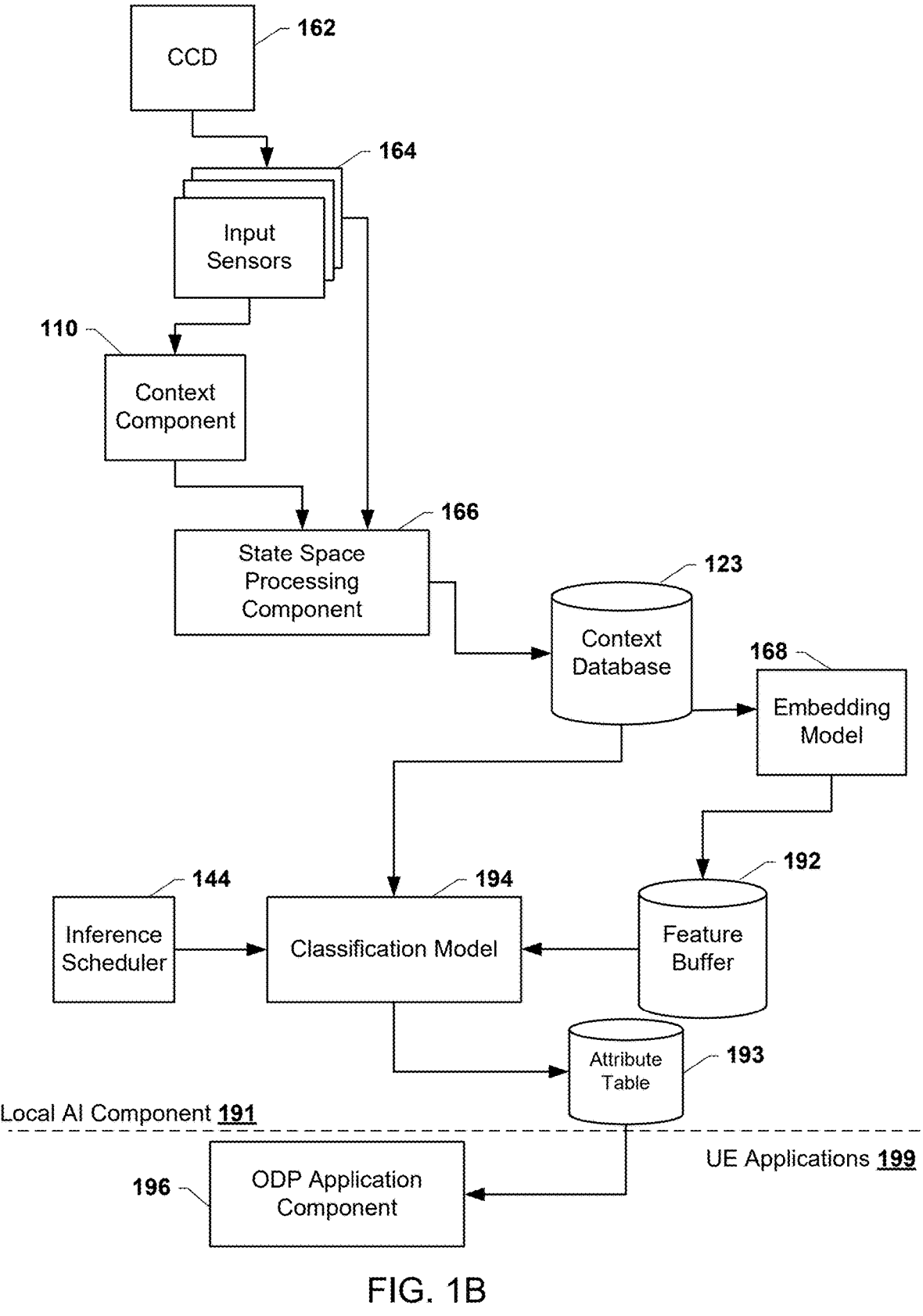
FIG. 1B is a system block diagram illustrating information flow through components of a UE system suitable for implementing various embodiments.

FIG. 1B is a system block diagram illustrating an example UE system suitable for implementing any of the various embodiments. In this flow diagram, the data flow is depicted sequentially through the various components of the on-device personalization system. With reference to FIGS. 1A and 1B, a charge-coupled device (CCD) camera 162 may record visual information which may be read directly as pictures or video or may connect to input sensors 164, which may record visual information in various specialized ways (e.g., average light exposure per second for daylight sensor).

As described regarding the UE sensors 113 of UE 105, the user device may be equipped with many sensors, including input sensors 164 (e.g., accelerometers, gyroscopes, GPS sensors, and light sensors). The input sensors 164 may output the sensor data to the context component 112, which may be configured via various sensor-specific algorithms to identify context and activities from the input sensor data. The input sensors 164 and the context component 112 may then output to a state processing component 166 that may assemble context data according to snapshots or points in time (time instances). These snapshots of collected context may each form a row in a state table with a single time stamp. Each row may be matched to a state or identified as a new state as described with reference to FIG. 4.

The state tables may be output to the context database 123, which may store the state tables for long-term context. The state information may be output periodically to an embedding model 168 to identify features in the context over time. The embedding model 168 may be an inference model, a machine learning (ML) process, or another weighted correlation algorithm. The embedding model 168 may operate as a feature extractor for various time scales to identify the relevant data from the extensive data in the state tables.

The embedding model 168 may identify and select relevant features from the state data/context data, which represent patterns or important information that the classifier of classification model 194 can use to make predictions. The feature extraction may operate to reduce the complexity of the data while retaining the most informative aspects that will improve the accuracy and efficiency of the classification model 194. For example, in an image classification task, a feature extractor might analyze an image (e.g., from camera 162) to identify edges, textures, or shapes that can help the classifier distinguish between different categories (like cats vs. dogs). In a text classification task, the feature extractor might focus on keywords, phrases, or sentiments to help the classifier determine the topic or tone of a document. The extracted features are then passed to the ML classifier for training or prediction and the extracted features may be output to a feature buffer 192.

The embedding model 168 may operate to further condense the information being ingested into the relevant features so that only a predetermined amount of state data is retained. This may improve storage efficiency. The extracted features may be stored in the feature buffer 192 and output to the classification model 194 at various intervals. In other words, the embedding model 168 may process a segment of the state table and store the results in the feature buffer 192 while the processing is ongoing and may output the features to the classification model 194 when complete.

A classification model (e.g., machine learning (ML) classifier or inference engine) may identify user attributes by analyzing the data generated by users' mobile activities to infer characteristics, behaviors, and preferences. This data (e.g., formatted as features and context data) may include information such as app usage patterns, location history, call and text activity, sensor data (like accelerometer or GPS), and browsing habits. The classification model 194 may process these inputs to detect patterns that can reveal attributes. By analyzing sensor data including step counts or movement patterns, the classifier may infer whether the user is walking, running, biking, or being generally active. Based on GPS data or location tracking, the classifier may determine whether the user is frequently traveling, commuting, or staying within a specific area. The user may be identified as a frequent traveler or if they prefer certain locations. By examining application usage and media consumption patterns stored on the UE, the classification model 194 may infer interests like hobbies, preferred content (e.g., music, games, or news), or even social engagement levels. The classification model 194 may detect daily routines, like typical waking or sleeping times, work hours, or habitual app use. This information can be used to create a behavioral profile of attributes of the user. Ultimately, the classification model 194 may determine user attributes for personalization, recommendation systems, and for tailoring services and content that align with the user's habits and preferences.

The classification model 194 may be scheduled to operate at particular intervals or at set times by the inference scheduler 144. The user or remote systems may request various inference schedules or operations. The classification model 194 may output the inferred attributes to the attribute table 193. The attribute table 193 may have categories with one or more attributes in each category assigned to the user. For example, the attribute table may include a sports category that includes attributes identifying the sports that the user engages in.

The operations and components of FIG. 1B (e.g., 110, 166, 123, 168, 144, 194, 192, and 193) may be contained within a local AI component 191 of the UE (e.g., 105). Accordingly, the processing of sensor data into user attributes may be performed entirely on the device, which enhances privacy. The local AI component 191 may provide the attributes of attribute table 193 to UE applications 199 to enable customization and personalization of the applications and UE operations. The UE may include an on-device personalization (ODP) application component 196 that may manage settings and other user experience options based on the detected attributes.

Figure 2:
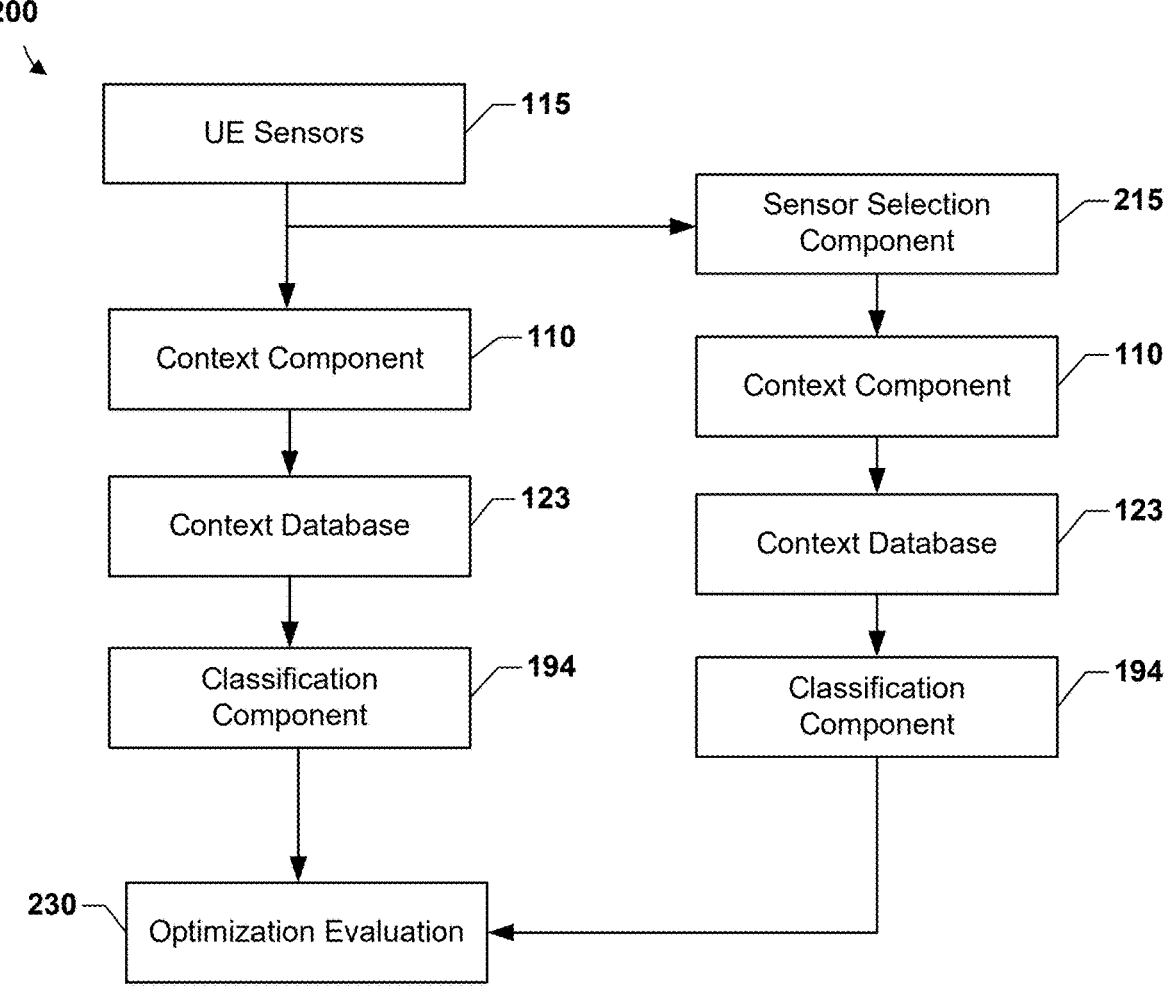
FIG. 2 is a system block diagram illustrating a sensor selection flow according to various embodiments.

FIG. 2 is a system block diagram illustrating a sensor selection flow 200 according to various embodiments. A sub-process of the methods described herein may include selecting which sensor data to use or store as relevant to the user (e.g., user's states, activities, attributes). With reference to FIG. 1A-2, a sensor selection component 215 may operate to implement a random sub-sampling policy as a tracking agent to evaluate the relevance of sensor data. The tracking agent may evaluate the information contribution of each sensor to the final attribute inference process. Over time, sensors that are less important to attribute inference may be weighted less, sampled less often (reduced resolution), or discarded.

The UE sensors 113 or a list thereof may provide sensor inputs to the context component 112, which may then output context information to the context database 123, which may then output context (e.g., state tables) to the embedding model 168 or the classification model 194. The classification model 194 may output, to the optimization evaluation 230, attributes together with the weights and key contexts that formed the basis for the classification.

In parallel, the sensor data from UE sensors 113 may be supplied to the sensor selection component 215 which may subset the sensor data such that only a subset of the sensor data is selected for processing. The sensor selection component may randomly select sensors for deactivation or sensor data to be discarded as part of the subset. In some embodiments, the sensor data may be compressed by reducing the resolution of the sensor data (e.g., retaining only every other sensor output). The sensor selection component 215 uses a random A/B test selection method for generating the subset of sensors/sensor data for the test.

The subset of sensor data may be supplied to the context component 112 to be processed in the same manner as the other set of data is processed (the set that bypasses the selection component). The context data from the context component 112 may be supplied to the context database 123 and then may be supplied to the classification model 194. The classification model 194 may output, to the optimization evaluation 230, attributes together with the weights and key contexts that formed the basis for the classification.

The optimization evaluation 230 may analyze the contribution of the sensor data that was removed by the sensor selection component 215 to determine whether the removed sensor data was determinative of one or more attributes. The evaluation of information loss can be based on attribute logs of identified attributes with or without a particular sensor while keeping the rest of the flow unchanged. The sensor selection may operate to determine whether a sensor is needed (True/False logic) or may determine a wakeup frequency of each sensor (i.e., a sensor resolution). In some aspects, the sensor selection criteria may be attribute-dependent. If a user confirms that a certain attribute is undesired, the related sensors can be turned off immediately based on the user's settings. For example, a user that travels may not wish the personalization to be based on current location. This process of A/B testing various sensors for their informational value may optimize sensor usage and sensor data storage by dynamically adjusting their duty cycles and frequency based on their contribution to user attribute inference.

The optimization evaluation 230 may output a recommendation that one or more sensors tested by the subset of the data should be turned ON/OFF for inference purposes, discarded/retained, or have their duty cycle adjusted. Since many other applications may use these sensors, those sensors may not be switched off and may simply not be processed or retained in state tables or context data. The optimization evaluation 230 may indicate to the UE that the ODP process does not require the sensor to be continuously collecting information. In some aspects, the optimization evaluation 230 may determine whether a predetermined balance between the information loss of the sensor data and a power cost of receiving the sensor data from the plurality of sensor inputs is above a threshold. In some aspects, the optimization evaluation 230 may determine whether a user's settings limit receipt of the sensor data from one or more of the plurality of sensor inputs. The optimization evaluation 230 may adjust a wake-up cycle of one or more sensors corresponding to the first subset of the sensor data or the second subset of the sensor data based on the predetermined balance and the user setting.

Figure 3:
FIG. 3 is a system block diagram illustrating components suitable to implement various embodiments.

FIG. 3 is a system block diagram illustrating components suitable to implement various embodiments. With reference to FIG. 1A-3, the system 300 may include a computing device 302 (e.g., UE 105) configured to communicate with one or more user devices 130 or other computing devices via a local wireless connection (e.g., radio links 127a, 127b, Wi-Fi 145, Bluetooth, Ant, etc.) or other near-field communication (NFC) communication technologies. The computing device 302 may also be configured to communicate with external resources (e.g., server 110) via a wireless connection 127a/127b to a wireless communication network 308, such as a cellular wireless communication network. Wireless connection 127a may be a radio link to picocell 306, which may connect via backhaul or midhaul 330 to communication network 308. Wireless connection 127b may be a radio link to gNB 304, which may connect via backhaul or midhaul 332 to communication network 308. The communication network 308 may connect to server 110 via link 121 (e.g., fiber), and the edge server 115 may be co-located with gNB 304.

The computing device 302 may include one or more processors 310, electronic storage (e.g. memory) 312, one or more sensor(s) 314 (e.g., UE sensors 113), a transceiver 316 (e.g., wireless transceiver), and other components. The computing device 302 may include communication lines, or ports to enable the exchange of information with a network and/or other computing platforms. Illustration of the computing device 302 in FIG. 3 is not intended to be limiting. The computing device 302 may include a plurality of hardware, software, and/or firmware components operating together to provide the functionality attributed herein to the computing device 302.

Electronic storage 312 may include non-transitory storage media that electronically stores information. The electronic storage media of electronic storage 312 may include one or both of system storage that is provided integrally (i.e., substantially non-removable) with the computing device 302 and/or removable storage that is removably connectable to the computing device 302 via, for example, a port (e.g., a universal serial bus (USB) port, a firewire port, etc.) or a drive (e.g., a disk drive, etc.). Electronic storage 312 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 312 may include one or more virtual storage resources (e.g., cloud storage, a virtual private network, and/or other virtual storage resources). Electronic storage 312 may store software algorithms, information determined by processor(s) 310, information received from the computing device 302, information received from the edge server 115, external resources (e.g., server 110), and/or other information that enables the computing device 302 to function as described herein.

Processor(s) 310 may include one or more local processors (as described with respect to FIGS. 13 and 14), which may be configured to provide information processing capabilities in the computing device 302 (e.g., UE 105). As such, processor(s) 310 may include one or more of a digital processor, an analog processor, a digital circuit designed to process information, an analog circuit designed to process information, a state machine, and/or other mechanisms for electronically processing information. Although processor(s) 310 is shown in FIG. 3 as a single entity, this is for illustrative purposes only. In some embodiments, processor(s) 310 may include a plurality of processing units that may operate as a processing system. These processing units may be physically located within the same device, or processor(s) 310 may represent the processing functionality of a plurality of devices operating in coordination.

The computing device 302 may be configured by machine-readable instructions 320, which may include one or more instruction modules. The instruction modules may include computer program components. In particular, the instruction modules may include one or more of a PKG component 322, a query engine 324, a user settings component 326, an accuracy component 328, and/or other instruction modules. Together, these components (e.g., 322-328) of computing device 302 may provide an ODP enhancement to a user experience.

The PKG component 322 may connect to one or more sensors 314 to receive sensor data and context information, including orientation, ranging, inertia, movement, direction, and other information. As a non-limiting example, the processor(s) 310 of the computing device 302 may receive sensor data directly from onboard sensors, such as the sensor(s) 314, and/or use one or more transceivers (e.g., 316, 1324) for detecting available wireless connections (e.g., Wi-Fi, Bluetooth, cellular, etc.) and for obtaining sensor data from remote sensors. Also, the PKG component 322 may be configured to determine whether a detected communication link is available to a user device 130 or other remote computing device (e.g., by measuring signal strength).

The PKG component 322 may perform processing of the input data from the sensors 314 as described with reference to FIGS. 1A and 1B. The PKG component 322 may include one or more inference engines to process input data into attributes that characterize a user. A knowledge graph may be a structured representation of information that connects various concepts, entities, or data points in a network of relationships. The PKG database may be a graph-like structure, where nodes represent entities (e.g., people, places, things, or concepts), and edges represent the relationships between those entities (e.g., "works at," "is a type of," "is related to"). A knowledge graph may encode semantic relationships, contextual information, and reasoning information as edges and nodes.

The query engine 324 may process queries from the user regarding attributes, context data, and other personalization information. The query engine 324 may respond to application (e.g., UE applications 199) queries regarding user preferences and context. The query engine 324 may provide a current user context with all attributes. The query engine 324 may provide user information based on a change or event, including a user location type (e.g., home/office). The query engine 324 may connect to the attribute tables (e.g., 193) and the classification model 194 as resources for responding to queries.

The user settings component 326 may receive user input establishing limits or preferences including on data collection. A user may select, via the user settings component 326, one or more attributes or features that are enabled or disabled for personalization. The user settings component 326 may be configured to enable or prevent queries from various applications depending on user choices. The user settings component 326 may provide suggestions for user settings, including device settings.

The accuracy component 328 may balance the power cost of sensor detection at various time frequencies, the information loss of eliminating one or more sensors or one or more duty cycles of the sensor, and the storage burden of the sensor data. The trade-off between cost and accuracy may be established by the user or by a particular power mode (e.g., low power mode) or other settings. The accuracy of the attributes may be tested periodically by querying the user themselves to review one or more attributes and confirm accuracy. The accuracy component 328 may connect to the optimization evaluation 230 to provide thresholds or limits (including dynamic thresholds) that may determine the balance of information loss in the optimization of sensor data retention.

As a non-limiting example, the processor(s) 310 of the computing device 302 may execute the PKG component 322, the query engine 324, the user settings component 326, and the accuracy component 328. The PKG component 322, the query engine 324, the user settings component 326, and the accuracy component 328 may include machine-readable instructions 320 that are executed by the processors 310 and stored on the electronic storage 312. The processor(s) 310 of the computing device 302 may provide one or more attributes of the user identified by the computing device 302 to the server 110 or the edge server 115 to personalize network operations or content delivery.

Figure 4:
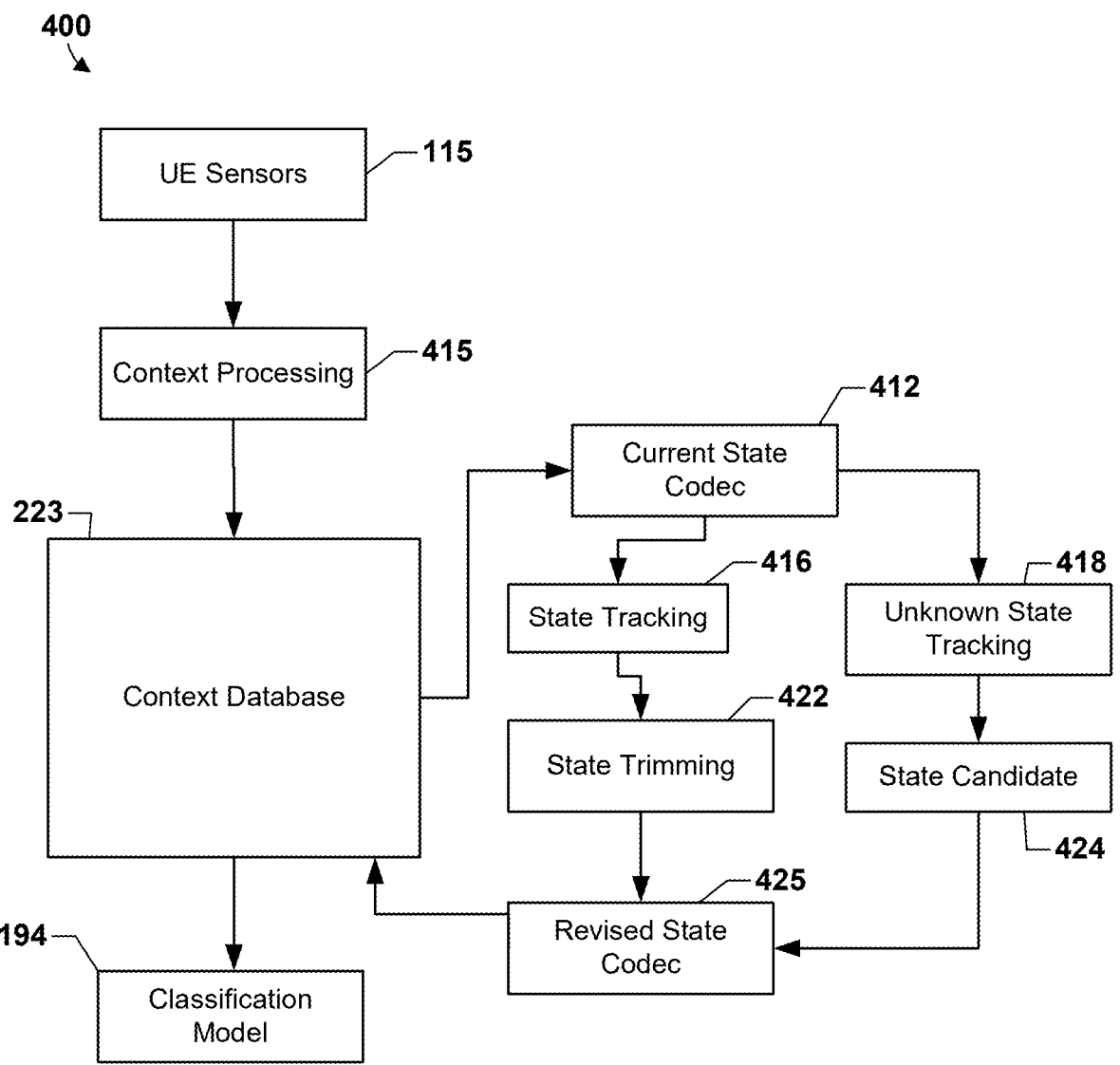
FIG. 4 is a system block diagram illustrating a flow of state data suitable to implement various embodiments.

FIG. 4 is a system block diagram illustrating a flow of state data suitable to implement various embodiments. With reference to FIG. 1A-4, the system 400 illustrates various sub-components of the state space processing component 166 and state mapping component 132. The UE sensors 113 may generate hundreds of different types of data points and the context processing 415 may generate various combinations of those data points, all of which may be provided to the context database 223. These different data points may combine into a wide variety of different user states, where hundreds of data types may result in millions of different combinations as states. Many states are not possible based on physical limitations. For example, detecting running and vehicular travel at the same time is not possible and so may be eliminated as a state.

To compress and derive the relevant states, vast numbers of states from large numbers of user devices may be analyzed to determine the scope of the user states. The data used to derive the set of valid states may also be generated synthetically as described below regarding FIG. 7. The set of valid states may be called a state codec or a state dictionary. A UE may be loaded with a validated state codec that includes names/codes for the various observable states. A state space processing component may manage the state codec, including adding and deleting states. The system 400 may match a set of context data from the context database 223 to a state in the current state codec 412. If the set of context data at a given time stamp (time instance) matches a state, the system 400 may assign that state to a row containing that context data in a state table and store the state table row back in the context database.

If the set of context data at a given time stamp (time instance) matches a state, the system 400 may pass the matched state to the state tracking element 416, which may record a count for each of the states in the current state codec 412 as it is matched. The system 400 may periodically evaluate the counts of states in the current state codec 412 and may trim states that have not been recently counted or which have low counts relative to newer states. The state trimming process 422 may recommend states to be removed from a codec based on a threshold number of counts or the last time used (e.g., age out). The system 400 may generate a revised state codec 425 based on the recommendations from the state trimming process 422. The revised state codec 425 may be stored in the context database 223.

If the set of context data at a given time stamp (time instance) does not match a state, the system 400 may generate a new state with a numerical name or generated sequence name for the detected state that does not match any of the current state codec's states. The system 400 may perform unknown state tracking 418 that determines whether the unknown state is a state that should be added to the state codec. The unknown state tracking 418 may include counting the number of times the particular unknown state is detected. Upon reaching a particular threshold of detections of one or more particular unknown states, the system 400 may recommend the unknown state to be a state candidate 424. The state candidate 424 may be added to the codec forming the revised state codec 425, which may be stored in the context database 223.

Figure 5:
FIG. 5 is a flow diagram illustrating a model training flow suitable to implement various embodiments.

FIG. 5 is a flow diagram illustrating a model training flow suitable to implement various embodiments. With reference to FIG. 1A-5, the system 500 illustrates various sub-components of the classification model 194 and inputs to the classification model 194. The UE sensors 113 may output sensor data to the context processing 415 (e.g., context recognition algorithms), which may output context data and sensor data to the context database 223. The context database 223 (or context database 123) may include state codecs and state tables as described above. The log of states recorded over a period of time (multiple time instances) may be input to the classification model 194 as input context 515. The embedding model 168 may extract features that are relevant to classification from the input context 515. The embedding model 168 may categorize various contexts into groups or ranges (e.g., ages, times of the day) for better classification relevance. The output of the embedding model 168 may be transmitted to the downstream classifiers 525a, 525b, and 525c.

Each of the downstream classifiers 525a, 525b, and 525c may be fine-tuned by adjusting input weights and layer weights based on external inputs, including user input 532, context sharing (e.g., application context) 534, and original equipment manufacturer (OEM) detection 536. As these weights are being adjusted based on the external inputs, adjustments to the embedding model or input context selection may be disabled. The external inputs may be received via the input/output (I/O) control 545, which may direct the external inputs to various downstream classifiers (e.g., 525a and 525b). For example, the downstream classifier 525a may be adjusted based on the user input 532 (e.g., ground truth user location description such as home); the downstream classifier 525b may be adjusted based on context sharing 534 (e.g., external feedback from applications); and the downstream classifier 525b may be adjusted based on OEM detection 536.

For example, if the classifier 525a predicts the user's location, but the user corrects it, this feedback is used to update the classifier 525a. The update may be performed by supervised learning, where the classifier 525a compares its predictions to the actual data (ground truth) and adjusts its weights to minimize errors. This process is described further with regard to FIG. 10. This process may involve continuous learning, where the classifiers 525a-c are updated and improved as they receive new data or corrections from various sources.

FIG. 6 is a flow diagram illustrating a model training flow suitable to implement various embodiments. With reference to FIGS. 1A-6, the system 600 illustrates various sub-components of the classification model 194 and various learning feedback loops to improve the performance of the embedding model 168. While FIG. 5 illustrates the feedback-based improvement of the downstream classifiers 525*a-c*, FIG. 6 illustrates the feedback-based improvement of the embedding model 168. Various different classification models 194 may operate on different UEs of different users. As a result, each classification model 194 may have different input contexts 515*a-c* associated with each user/UE.

The various input contexts 515*a-c* may be provided to the embedding model 168 of each UE, which may extract features from the input contexts 515*a-c*. The number of different UEs illustrated is purely as an example and not meant to be limiting since, in many cases, the adjustments described herein may be based on thousands of such feedback from thousands of devices. A feature embedding network (embedding model) may transform raw data (such as user states, text, images, or sensor data) into a low-dimensional, dense representation called an embedding. These embeddings may capture the key features or patterns from the input data, making them suitable for further processing by downstream models, such as classifiers 525*a-c*. For a classification task, the embedding model 168 may extract features from mobile device data (e.g., location, movement patterns) and map them to a feature space.

The extracted features from the embedding model 168 may be supplied to each of the self-training components 620*a-c*. In addition, the different input contexts 515*a-c* may be supplied to each of the self-training components 620*a-c*. The self-training components 620*a-c* may be autoregressive models that may predict features by relying on their own previous outputs. The autoregressive models use past predictions to inform future ones. For example, the model might predict a user's activity or state (e.g., walking or running) based on the input context. These predictions may be fed back into the autoregressive model to help predict the next state (e.g., continuing walking or starting running). The classification model 194 may be provided with the autoregressive model's future predictions to evaluate the output of the embedding model 168.

The self-training components 620*a-c* may generate weight adjustments that may be output to a shared storage where the weights can be compiled and evaluated in the weight fusion component 610. The weight fusion component 610 may combine and synthesize the appropriate weights for different geographical areas or different demographics. The weight fusion component 610 may output the adjusted weights derived from the combined feedback to the weight redistribution component 630. The weight redistribution component 630 may determine which weights of which embedding models 168 (e.g., for which UEs) may be updated. This arrangement maintains the privacy of each user's input contexts and shares the weights or weight adjustments from the self-training components 620*a-c*.

Figure 7:
FIG. 7 is a flow diagram illustrating a data generation flow suitable to implement various embodiments.

FIG. 7 is a flow diagram illustrating a data generation flow suitable to implement various embodiments. The system 700 may query a large language model (LLM) 765 in a series of queries that each develop data sets that may be used as the basis for the synthetic context logs for training. With reference to FIGS. 1A-7, the synthetic data generator 702 may generate a first query 705 requesting the LLM 765 to develop a detailed user profile based on input characteristics (e.g., a middle-aged male math professor in China). The generated user profile from the LLM 765 may include hobbies, home address, work address, height, weight, and other characteristics. Many of these user profiles may be generated and stored in the profile log 715.

Based on each of the user profiles stored in the profile log 715, the synthetic data generator 702 may query the LLM 765 in a second query 725 requesting the LLM 765 to generate a series of activities or actions that a person with a particular profile may perform over a single day. This second query may be repeated for each hour or each day of the week to generate a series of synthetic actions that the user may take based on their profile. These series of activities and actions over days, weeks, and months for each user may be stored in an activity log 735. For example, a single activity log may be: "6:30 am—Get ready for the day, brush teeth, shower, dress up, and pack lunch."

For each of the activities and actions in the activities log 735 for each user, the synthetic data generator 702 may query the LLM 765 in a third query 745 requesting details as to context that corresponds to the activity in the activity log. For example, the context may include location, speed, intensity of exercise, heart rate, and other characteristics of the activity. The activities may include working, commuting, running, having dinner, and other actions by a user. For each of the activities and actions in the activities log 735 for each user, the LLM 765 may generate context logs 755. The LLM 765 may be prompted such that the context logs 755 match the form and format of context information that would be collected and processed by the UE while in use (e.g., by the context component 112). The LLM 765 may be provided with a context dictionary that parameterizes the fields being requested for each activity, where many fields may be blank for a given activity.

From the synthetic context data or from collected user history, an LLM or other inference engine may identify a set of states that are possible based on real-world activities of people. The set of valid states may be called a state dictionary or a state codec. Each state may be formed of a series of context fields. The set of valid context values and various category headings for the valid context values may form a context codec. The context codec may be used by the algorithms of the context component 112 to map sensor values into usable context values (as fields/tags). A context category and fields, for example, may be: {transportation mode: "bike", "car", "train", "bus", "on-foot", "still", "in-flight", "boat", "not applicable", "unknown"}.

The context codec may be reduced to the top percentiles (e.g., 90%, 85%, 80%) of the context codec entries as ranked by occurrence count. The compressed context codec may range between 300 and 100 different context combinations with the low occurrence context combinations removed. A context combination may be called herein as a user state since the combination of context fields indicates a user state. To determine user demographic information, the classifiers described herein may analyze the frequency and timing of the different state recorded for a user. The classifier (e.g., classification model 194) may identify a user attribute by recognizing common clusters of user states in similar time periods.

Figure 8:
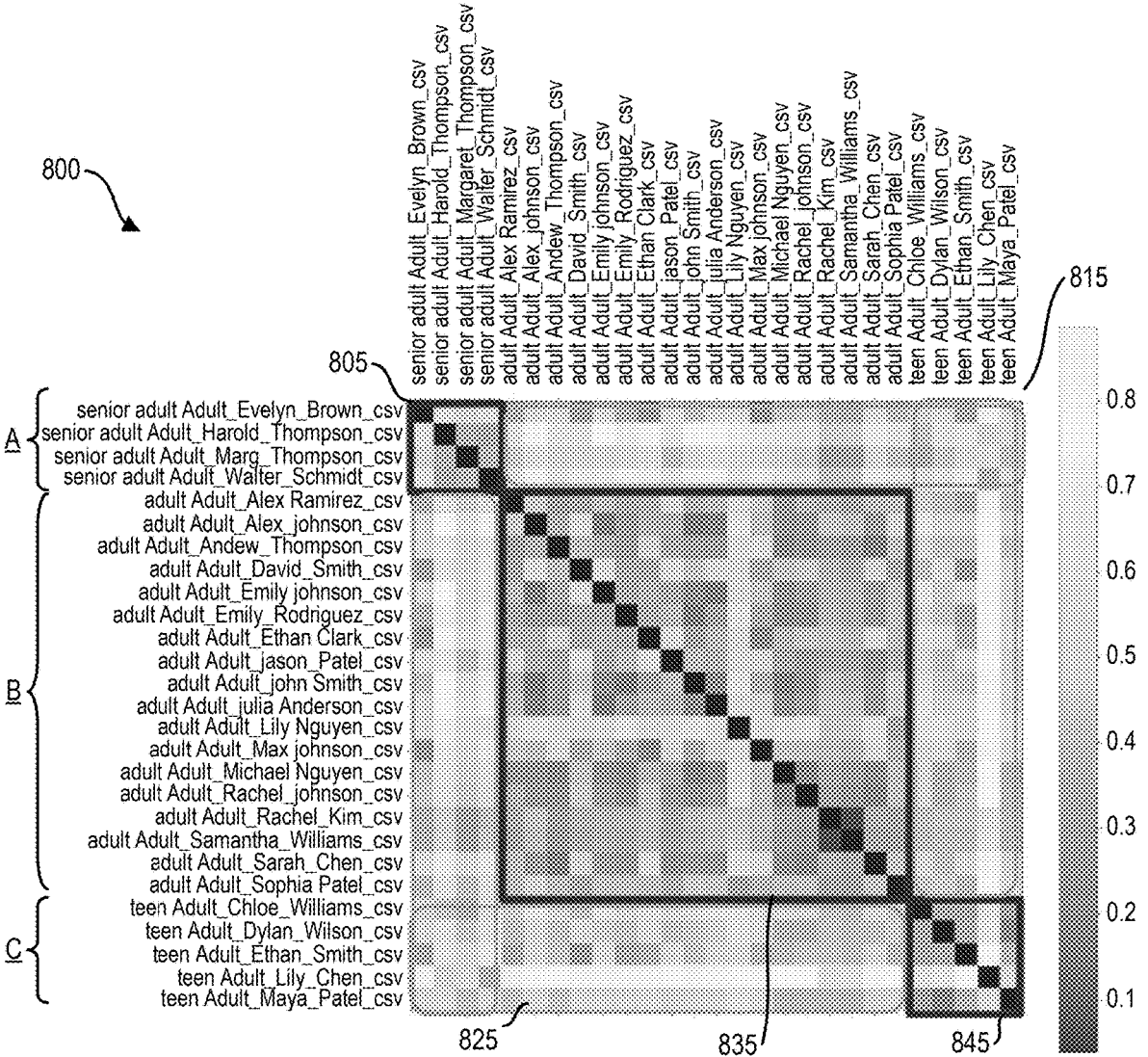
FIG. 8 is a heat map illustrating state groupings according to some embodiments.

FIG. 8 is a heat map 800 illustrating the distance between various users' states. With reference to FIGS. 1A-8, in the heat map 800, the distance is illustrated with low distance as darker shades than greater distances as shown in the scale on the right side going from zero to one, where 0.1 is a lower distance than 0.8. Each side of the heat map 800 contains the same twenty-seven users. The users are arranged according to age, where Group A is senior adults; Group B is adults; and Group C is teens. The row of black squares along the diagonal is the correspondence between the same individuals, showing zero distance. In the first area 805 where members of Group A overlap with other members of Group A, the distance between the users is less than the surrounding areas. For example, members of Group B (Adults) may be working and have different states and timing than the members of Group A (seniors).

Likewise, in the second area 835, where Group B overlaps with Group B (adults), the distance is less than the regions above (Seniors) or below (Teens). In the third area 845, Group C overlaps with Group C (Teens) and is also closer in distance than the nearby areas where teens are compared with adults under the distance metric. The areas with the highest distance are the fourth area 815 and the fifth area 825 which covers comparisons of different Groups (e.g., Group A with C). The classifiers may determine the age group of a user based on a distance comparison with others in a known age group, as they will have similar activities and schedules.

Figure 9:
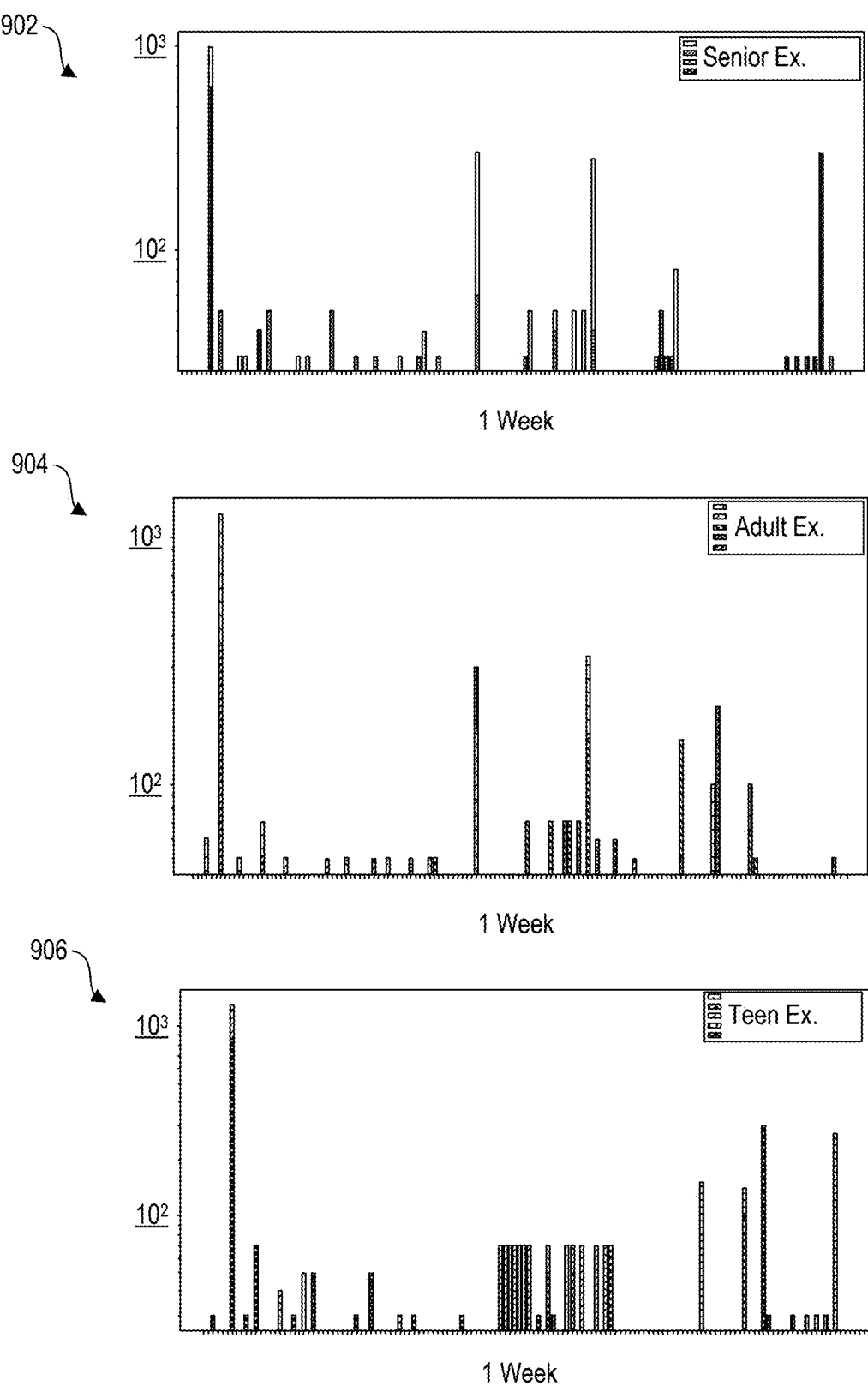
FIG. 9 is a series of bar charts illustrating state groupings according to some embodiments.

FIG. 9 is a series of graphs illustrating how various users of different groups cluster in the same way as the rest of their group but differently than other groups. Activity is shown on a log scale. With reference to FIGS. 1A-9, the counts for each time period across each of the one week graphs may be counts for all activity or a specific category of activity (e.g., motion). In graph 902, which illustrates various example senior adults throughout the week, the different users of the same age group have activity patterns that overlap and cluster as shown. Likewise, in graph 904, which illustrates various example adults throughout a week, the different users of the same age group have activity patterns that overlap and cluster. Similarly, in graph 906, which illustrates various example teens throughout a week, the different users of the same age group have activity patterns that overlap and cluster.

In some embodiments, this clustering may be recognized by the classifier (e.g., classification model 194) to determine the age group of a user as an attribute. For example, the activities may be extracted as n-grams and the clustering identified by a K-means clustering algorithm. This process may identify clusters of codec sequences that characterized each age group.

Figure 10:
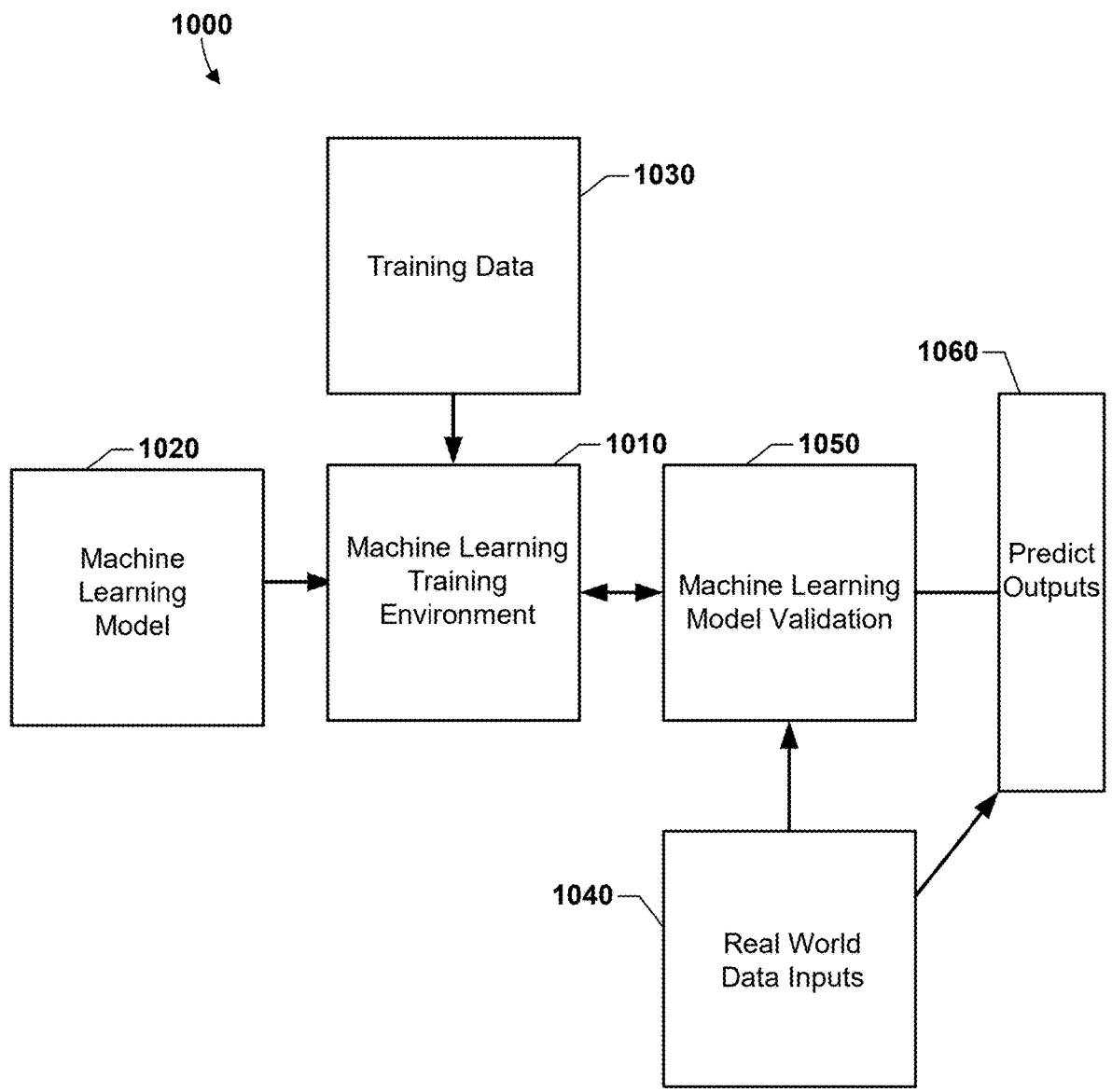
FIG. 10 is a block diagram illustrating a machine learning process suitable for implementing some embodiments.

FIG. 10 is a process flow diagram illustrating an example process flow 1000 for training a machine learning model to predict attributes of different users. With reference to FIGS. 1A-10, the process 1000 may be performed by a server, such as the server 110, to train the classification model 194. The machine learning environment 1010 may be executed on processors (e.g., 1314, 1316, 1401) to train a machine learning model of the classification model 194. The machine learning model 1020 may take as predictors not only the context data and user states, but also may ingest the features extracted by the embedding model.

For example, a machine learning algorithm (e.g., software code) or model 1020 is provided that maps data inputs (e.g., user activity features) to predicted outputs (e.g., age). In the machine learning environment 1010, the machine learning model 1020 may be trained using training data 1030 (e.g., a portion of the user features in the feature buffer). For example, the training data 1030 may be a representational set of data for self-supervised training by the machine learning model 1020, or may have been pre-classified by humans (e.g., synthetic data), or a combination of both. After the machine learning model 1020 has been trained using the training data 1030, the machine learning model 1020 may be tested, with real world data inputs 1040 to determine an accuracy of the machine learning relative to the real-world results. For example, in the case of a neural network the accuracy of the mapping between inputs and outputs may be determined using the real-world inputs 1040.

If an accuracy of the machine learning does not satisfy a desired accuracy (e.g., 95%, 98%, 99% accurate) threshold under testing by the real-world inputs 1040 in the machine learning validation 1050, the machine learning code may be tuned or the training data 1030 may be tuned. The tuning may include adding one or more predictor inputs (e.g., context data). The training in the ML training environment 1010 may be repeated to achieve the desired accuracy. In this way, training in machine learning environment 1010 and machine learning model validation 1050 may be repeated until the machine learning model 1020 is able to classify the real-world data inputs 1040 with the desired accuracy. For example, with respect to the classification model 194 of FIG. 5, the tuning may be performed on one or more of the downstream classifiers 525a-c via I/O 545 (e.g., by weight tuning). For example, with respect to the embedding model 168, tuning may be performed by the autoregressive self-training components 620a-c or the weight redistribution component 630.

After determining, with machine learning model validation 1050, that an accuracy of the machine learning model 1020 satisfies the desired accuracy, the process 1000 the machine learning model 1020 may be used to predict outputs 1060 in a classification model 194. The process 1000 may be used to train each of multiple machine learning algorithms (e.g., classifiers, inference models) described herein, and may be trained on separate data sets or trained to predict different outputs. That is, a machine learning model for the embedding model 168 may be trained differently and configured differently than classification model 194 (e.g., different training data, different inputs, different outputs).

FIG. 11A is a process flow diagram illustrating an example method 1100 for identifying user attributes according to some embodiments. With reference to FIGS. 1A-11A, the operations of the method 1100 are described with reference to a UE and the processors within that device. Various means for performing the operations of the method 1100 may include one or more processors (e.g., 310, 1316, 1401) of a UE coupled to memory (e.g., 312, 1320, 1358) or from a remote source, such as a remote system (e.g., server 110) or external resources using a transceiver (e.g., 316, 1366) and related components. One or more processors may form a processor system which may operate to execute one or more machine readable and executable instructions, which may be stored on a non-transitory storage medium (computer readable medium). To encompass the various components that may be use to implement the method 1100, the following description of the method operations refers to a "processor" of the UE.

In block 1102, a processor of a UE may receive sensor data associated with activity of a user from a plurality of inputs at a first-time instance. An inference neural network model may be trained by: querying an artificial intelligence (AI) model to complete a user profile based on a set of user profile fields, querying the AI model to complete user activity in a given time period based on the completed user profile, querying the AI model to complete context logs of synthetic sensor data associated with the user activity, assembling the responses to the queries into a training dataset, and using the training dataset to derive weighting parameters associated with the inference model. The sensor data may be from UE sensors (e.g., 115).

The process may include training the inference model based on the training dataset and the sensor data by one of: mixing the sensor data into the training dataset, upsampling the training dataset using the sensor data, or querying the AI model to fill gaps in the sensor data based on the user profile.

In block 1104, the processor may determine a state of the user at the first-time instance based on the sensor data. The processor may process the sensor data into context information which may be assembled together from various sensors at a time instance as a state of the user at the time instance. Determining the state of the user may include matching the sensor data at the first-time instance with the state based on a state dictionary, where the state dictionary includes a set of valid states of user context information. In some embodiments, determining a state of the user may include: determining whether the sensor data at the first-time instance matches a first state in a state dictionary, and adding the sensor data to the state dictionary stored in memory as a first unknown state in response to determining that the sensor data at the first-time instance matches a first state in a state dictionary; or recording a count of the first state in a state table that records states of the user in a given period of time.

In some embodiments, the first unknown state may be added to the state dictionary stored in memory, and the operations in block 1104 may further include identifying the first unknown state as a user specific state based on an occurrence count for the first unknown state within a second given period of time, requesting, via the UE, a user input to label the first unknown state, and recording the first unknown state as a labeled state in the state dictionary based on the user input. In some embodiments, the operations in block 1104 may further include recording, by the processor, a count of the first unknown state in the state table in response to determining that the sensor data during the first-time instance matches the first unknown state stored in the state dictionary.

In block 1106, the processor may identify at least one attribute of the user or the activity of the user based on the sensor data and the state of the user collected at multiple time instances including the first-time instance, where identifying the at least one attribute includes using an inference model to receive selected sensor data as an input and to provide an output classifying the state of the user at the multiple time instances as an attribute of the user. The inference model may be a machine learning model or an AI classifier.

In block 1108, the processor may store in memory the state of the user collected at the multiple time instances and the at least one attribute in a format that is accessible to applications that execute on the UE and that enables such applications to perform differently based on the at least one attribute of the user. The at least one attribute and the states of the user may be stored in a personal knowledge graph (PKG) database of the UE. The processor may update the inference model in an on-device retraining, where the on-device retraining is based at least in part on a state dictionary including a first unknown state.

FIGS. 11B and 11C are process flow diagrams illustrating examples of further operations 1110, 1120 that may be performed within the method 1100 for adjusting weights within the inference model (method 1110) or retraining the inference model (method 1120) according to some embodiments. With reference to FIGS. 1A-11C, the operations of the methods 1110 and 1120 are described with reference to a UE and the processors within that device. Various means for performing the operations of the methods 1110, 1120 may include one or more processors (e.g., 310, 1316, 1401) of a UE coupled to memory (e.g., 312, 1320, 1358) or from a remote source, such as a remote system (e.g., server 110) or external resources using a transceiver (e.g., 316, 1366) and related components. One or more processors may form a processor system which may operate to execute one or more machine readable and executable instructions, which may be stored on a non-transitory storage medium (computer readable medium). To encompass the various components that may be used to implement the methods 1110, 1120, the following description of the method operations refers to a "processor" of the UE.

After performing operations of block 1106 of the method 1100, in block 1112 the processor may determine one or more inference weights associated with the at least one attribute of the user that were identified in block 1106. In some embodiments, this operation may involve identifying within the model inference weights assigned to tokens within the inference model that are the transformed representation of the identified at least one attribute of the user.

In block 1114, the processor may transmit only the identified one or more weights to a remote computing device to adjust the one or more weights based on related weights from related users. In such transmission, the users may be related based at least on geolocation. The remote computing device may be configured to use user-related weights to adjust the weights in inference models.

In block 1116, the processor may receive one or more adjusted weights from the remote computing device.

In block 1118, the processor may update the inference model of the UE based on the one or more adjusted weights. In some embodiments, such operations may involve updating the inference model weights through the substitution of some or all weights within the inference model with replacement weights transmitted to the UE by the remote computing device. In some embodiments, such operations may involve updating the inference model weights by changing selected inference model weights through addition, subtraction or multiplication by a factor transmitted to the UE by the remote computing device.

The processor may then perform the operations of block 1108 of the method 1100 as described.

Referring to FIG. 11C, after the operations in the method 1100, the processor may update the inference model in an on-device retraining, in which the on-device retraining is based at least in part on the state dictionary including the first unknown state in block 1118. This retraining may include performing any of a variety of known machine learning techniques to update inference model weights based on information in the first unknown state.

FIG. 11D is a process flow diagram illustrating an example of further operations 1130 that may be performed within the method 1100 for managing the state dictionary according to some embodiments. Aspects of the method 1130 may include adding newly identified states and removing unused or non-useful states from the state dictionary. With reference to FIGS. 1A-11D, the operations of the methods 1130 are described with reference to a UE and the processors within that device. Various means for performing the operations of the method 1130 may include one or more processors (e.g., 310, 1316, 1401) of a UE coupled to memory (e.g., 312, 1320, 1358) or from a remote source, such as a remote system (e.g., server 110) or external resources using a transceiver (e.g., 316, 1366) and related components. One or more processors may form a processor system which may operate to execute one or more machine readable and executable instructions, which may be stored on a non-transitory storage medium (computer readable medium). To encompass the various components that may be used to implement the method 1130, the following description of the method operations refers to a "processor" of the UE.

After performing operations of block 1108 of the method 1100, in block 1132 the processor may add the sensor data to the state dictionary stored in memory as a first unknown state in response to determining that the sensor data at the first-time instance matches a first state in the state dictionary. An unknown state may initially not have a label or name, or may be labeled with a random string in the state table and state dictionary. An unknown state may be a combination of context information that does not match another known or unknown state in the state dictionary.

In block 1134, the processor may identify the first unknown state as a user specific state based on an occurrence count for the first unknown state within a second given period of time. For example, within a predetermined time period the processor may identify that the first unknown state has occurred frequently enough (e.g., above given threshold) that the combination of context information is not coincidence and may correspond to a user activity which may be unique to that user (e.g., base jumping).

In block 1136, the processor may record a count of the first unknown state in the state table in response to determining that the sensor data during the first-time instance matches the first unknown state stored in the state dictionary. A count may be a column in a state table or a separate register of memory retaining counts for each of the states in the state dictionary.

In block 1138, the processor may request a user input to label the first unknown state. The UE may display a prompt on a screen of the UE or may ask the user via a speaker of the UE what is the name of an activity being performed. The UE may prompt the user during an activity that has been recognized as matching an unknown state that is relevant to the user or to determining the user attributes. The UE may prompt the user with details of the unknown state and request a label upon determining that an unknown state is relevant to the user or to the user attributes.

In block 1140, the processor may record the first unknown state as a labeled state in the state dictionary based on the user input. For example, the processor may change the label (e.g., row heading) for the unknown state into a label that corresponds to the label input by the user. The unknown state make be updated to a labeled or known state in one or more areas including the state table, a count table recording occurrences of states, and the state dictionary. After updating these records, the processor may continue or return to block 1106 and re-evaluate attributes of the user.

After performing operations of block 1108 of the method 1100, in block 1142 the processor may record a count of the first state in a state table that records states of the user in a first given period of time. For example, for each occurrence of each state in the state dictionary, the processor may match the state upon occurrence and may increase a count for the state in a state table or a separate count table.

In block 1144, the processor may determine whether the first state is relevant to one or more attributes of the at least one attribute of the user. For example, if the first state is determinative as an input to the inference engine that determines an attribute, the first state may be relevant to an attribute of the user. For example, if the first state has been weighted below a threshold in the inference engine (e.g., Thai food restaurants as locations may be weighted below a threshold in Thailand), the first state may not be relevant to an attribute of the user.

In block 1146, the processor may remove the first state from the state dictionary based on the count of the first state in response to whether the first state is relevant to the one or more attributes. For example, if the count associated with the first state is below a threshold, then the first state maybe removed by the state dictionary in response to whether the first state is relevant to the one or more attributes. If the count associated with the first state is not below a threshold, then the processor may not remove the first state from the state dictionary. In some cases, a state may have a high occurrence count but may not be determinative or relevant to any particular attribute (e.g., eight hours average in sleep state).

Upon modification of the state dictionary, state table, or count table, the method and process may return to block 1106 where attributes may be identified based on the state table via an inference engine that updates and learns from these changes. In some aspects, the system and method maintain efficiency by trimming and adjusting state dictionary to maintain relevance of the data collected. For example, as described above, the state dictionary may be updated based on the use or non-use of a state by the inference engine/model.

FIG. 12 is a process flow diagram illustrating an example method 1200 for efficiently selecting the sensor data to be retained for classification. With reference to FIGS. 1A-12, the operations of the method 1200 are described with reference to a user equipment (user device and the processors within that device. Examples of user equipment (UE) may be smartphones, tablets, laptops, and other devices. Various means for performing the operations of the method 1200 may include one or more processors (e.g., 310, 1316, 1401) of a UE coupled to memory (e.g., 312, 1320, 1358) or from a remote source, such as a remote system (e.g., server 110) or external resources using a transceiver (e.g., 316, 1366) and related components. One or more processors may form a processor system which may operate to execute one or more machine readable and executable instructions, which may be stored on a non-transitory storage medium (computer readable medium). To encompass the various components that may be use to implement the method 1200, the following description of the method operations refers to a "processor" of the UE.

In block 1202, the processor may select a first subset of the sensor data and a second subset of the sensor data. The processor may select the first subset of the sensor data randomly by activating a random subset of the plurality of inputs or select the second subset of the sensor data randomly by de-activating a test input of the plurality of inputs. The first subset of the sensor data may relate to the plurality of inputs, and the second subset of the sensor data may relate to the plurality of inputs excluding a test input of the plurality of inputs. Selecting the second subset of the sensor data may include periodically de-activating a first input of the plurality of inputs, thereby reducing the resolution of the sensor data from the first input.

In block 1204, the processor may determine an information loss for the first subset of the sensor data relative to the second subset of the sensor data based on a set of factors, including frequency of change of a sensor value, sensor value differences relative to different states of the user, and whether a sensor value is determinative of one or more states of the user. The processor may determine whether a predetermined balance between the determined information loss and a power cost of receiving the sensor data from the plurality of inputs is satisfied. The processor may determine whether a user setting limits receipt of the sensor data from one or more of the plurality of inputs.

In block 1206, the processor may discard the first subset of the sensor data or the second subset of the sensor data based on the determined information loss, where the first subset of the sensor data and the second subset of the sensor data are different and not mutually exclusive. Discarding the first subset of the sensor data may include periodically de-activating a first input of the plurality of inputs, thereby reducing a resolution of the sensor data from the first input.

In block 1208, the processor may adjust a wake-up cycle of one or more sensors corresponding to the first subset of the sensor data or the second subset of the sensor data based on the determined information loss. The processor of a UE may adjust a wake-up cycle of one or more sensors corresponding to the first subset of the sensor data or the second subset of the sensor data based on the predetermined balance and the user setting.

FIG. 13 is a component block diagram illustrating an example computing and wireless modem system 1300 suitable for implementing any of the various embodiments. Various embodiments may be implemented on a number of single processor and multiprocessor computer systems, including a system-on-chip (SOC) or system in a package (SIP).

With reference to FIGS. 1A-13, the illustrated example computing system 1300 includes two SOCs 1302, 1304 (which may be a SIP in some embodiments) coupled to a clock 1306, a voltage regulator 1308, and a wireless transceiver 1366 configured to send and receive wireless communications via an antenna (not shown). In some embodiments, the first SOC 1302 may operate as central processing unit (CPU) of a UE that carries out the instructions of software application programs by performing the arithmetic, logical, control, and input/output (I/O) operations specified by the instructions. In some embodiments, the second SOC 1304 may operate as a specialized processing unit. For example, the second SOC 1304 may operate as a specialized 5G processing unit responsible for managing high volume, high speed (such as 5 Gbps, etc.), and/or very high frequency short wavelength (such as 28 GHz mmWave spectrum, etc.) communications.

The first SOC 1302 may include a digital signal processor (DSP) 1310, a modem processor 1312, a graphics processor 1314, an application processor 1316, one or more coprocessors 1318 (such as vector co-processor) connected to one or more of the processors, electronic storage 1320, custom circuity 1322, system components and resources 1324, an interconnection/bus module 1326, one or more temperature sensors 1330, a thermal management unit 1332, and a thermal power envelope (TPE) component 1334. The thermal management unit 1332 and the thermal power envelope (TPE) component 1334 may communicate with the other components to determine their temperatures. The second SOC 1304 may include a 5G modem processor 1352, a power management unit 1354, an interconnection/bus module 1364, a plurality of mmWave transceivers 1356, memory 1358, and various additional processors 1360, such as an applications processor, packet processor, etc.

Each processor 1310, 1312, 1314, 1316, 1318, 1352, 1360 may include one or more cores and one or more temperature sensors, and each processor/core may perform operations independent of the other processors/cores. For example, the first SOC 1302 may include a processor that executes a first type of operating system (such as FreeBSD, LINUX, OS X, etc.) and a processor that executes a second type of operating system (such as MICROSOFT WINDOWS 10). In addition, any or all of the processors 1310, 1312, 1314, 1316, 1318, 1352, 1360 may be included as part of a processor cluster architecture (such as a synchronous processor cluster architecture, an asynchronous or heterogeneous processor cluster architecture, etc.).

The first and second SOC 1302, 1304 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 1324 of the first SOC 1302 may include power amplifiers, voltage regulators, oscillators, phase-locked loops, peripheral bridges, data controllers, memory controllers, system controllers, access ports, timers, and other similar components used to support the processors and software clients running on an AR device. The system components and resources 1324 and/or custom circuitry 1322 may also include circuitry to interface with peripheral devices, such as cameras, electronic displays, wireless communication devices, external memory chips, etc.

The first and second SOC 1302, 1304 may communicate via interconnection/bus module 1350. The various processors 1310, 1312, 1314, 1316, 1318 may be interconnected to the electronic storage 1320, system components and resources 1324, and custom circuitry 1322, and a thermal management unit 1332 via an interconnection/bus module 1326. Similarly, the processor 1352 may be interconnected to the power management unit 1354, the millimeter (mm)-wave transceivers 1356, memory 1358, and various additional processors 1360 via the interconnection/bus module 1364. The interconnection/bus module 1326, 1350, 1364 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 1302, 1304 may further include an input/output module (not illustrated) for communicating with resources external to the SOC, such as a clock 1306 and a voltage regulator 1308. Resources external to the SOC (such as clock 1306, voltage regulator 1308) may be shared by two or more of the internal SOC processors/cores.

In addition to the example SIP 1300 discussed above, some embodiments may be implemented in a wide variety of computing systems, which may include a single processor, multiple processors, multicore processors, or any combination thereof.

Figure 14:
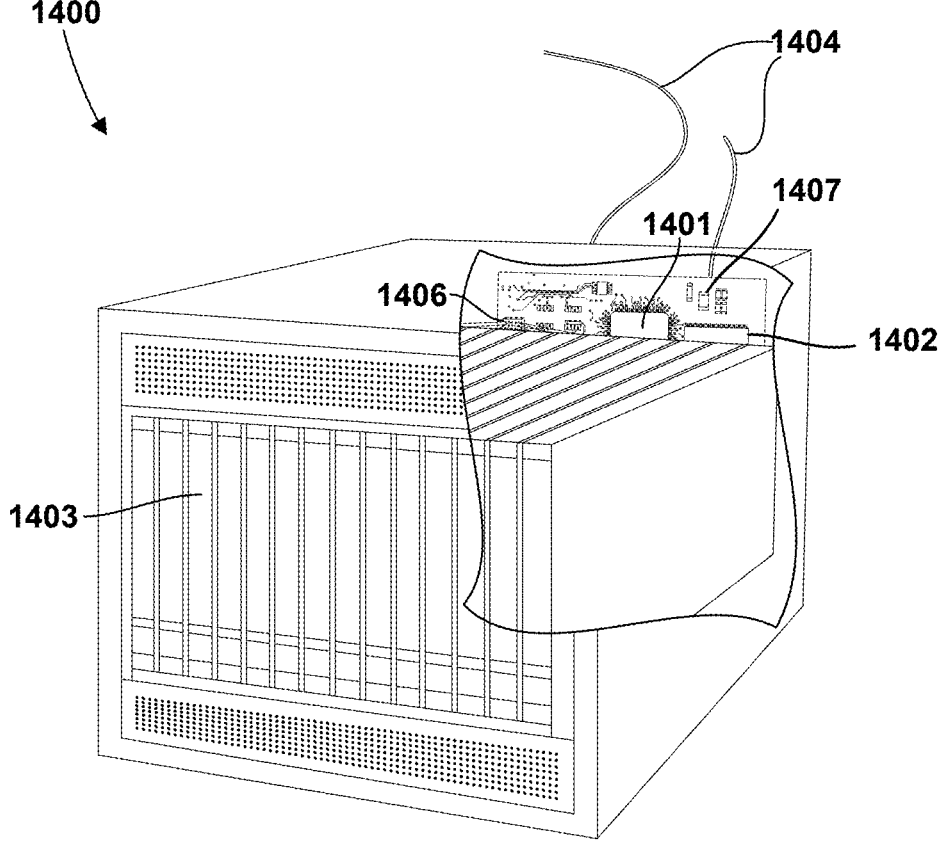
FIG. 14 is a component block diagram of a network device suitable for use with various embodiments.

Various embodiments (including, but not limited to, embodiments discussed above with reference to FIGS. 1A-13) may be implemented on a variety of computing devices, an example of which is illustrated in FIG. 14 in the form of a server. With reference to FIG. 1A-14, the network computing device 1400 (e.g., server 110, edge server 115) may include a processor 1401 coupled to volatile memory 1402 and a large capacity nonvolatile memory, such as a disk drive 1403. The network computing device 1400 may also include a peripheral memory access device such as a floppy disc drive, compact disc (CD) or digital video disc (DVD) drive 1406 coupled to the processor 1401. The network computing device 1400 may also include network access ports 1404 (or interfaces) coupled to the processor 1401 for establishing data connections with a network, such as the Internet and/or a local area network coupled to other system computers and servers. The network computing device 1400 may include one or more transceivers 1407 for sending and receiving electromagnetic radiation that may be connected to a wireless communication link. The network computing device 1400 may include additional access ports, such as USB, Firewire, Thunderbolt, and the like for coupling to peripherals, external memory, or other devices.

The processors of the UE 105 and the network device 1400 may be any programmable microprocessor, microcomputer, or multiple processor chip or chips that can be configured by software instructions (applications) to perform a variety of functions, including the functions of some embodiments described below. In some wireless devices, multiple processors may be provided, such as one processor within an SOC 1404 dedicated to wireless communication functions and one processor within an SOC 1404 dedicated to running other applications. Software applications may be stored in the electronic storage 312, 1320 before they are accessed and loaded into the processor. The processors may include internal memory sufficient to store the application software instructions.

Various embodiments illustrated and described are provided merely as examples to illustrate various features of the claims. However, features shown and described with respect to any given implementation are not necessarily limited to the associated implementation and may be used or combined with other embodiments that are shown and described. Further, the claims are not intended to be limited by any one example implementation. For example, one or more of the operations of the methods 1100 and 1200 may be performed in an order other than illustrated and described, including in parallel or as a combination of operations.

Implementation examples are described in the following paragraphs. While some of the following implementation examples are described in terms of example methods, further example embodiments may include: the example methods discussed in the following paragraphs implemented by a UE including a processor configured with processor-executable instructions to perform operations of the methods of the following implementation examples; the example methods discussed in the following paragraphs implemented by a UE including means for performing functions of the methods of the following implementation examples; and the example methods discussed in the following paragraphs may be implemented as a non-transitory processor-readable storage medium having stored thereon processor-executable instructions configured to cause a processor of a UE to perform operations of the methods of the following implementation examples.

Aspect 1. A method performed by a user equipment (UE), including: receiving, by a processor of the UE, sensor data associated with activity of a user from a plurality of inputs at a first-time instance; determining, by the processor, a state of the user at the first-time instance based on the sensor data; identifying, by the processor, at least one attribute of the user or the activity of the user based on the sensor data and the state of the user collected at multiple time instances including the first-time instance, wherein identifying the at least one attribute includes using an inference model to receive selected sensor data as an input and to provide an output classifying the state of the user at the multiple time instances as an attribute of the user; and storing in memory the state of the user collected at the multiple time instances and the at least one attribute in a format that is accessible to applications that execute on the UE and that enables such applications to perform differently based on the at least one attribute of the user.

Aspect 2. The method of Aspect 1, further including selecting, by the processor, a first subset of the sensor data and a second subset of the sensor data; determining, by the processor, an information loss for the first subset of the sensor data relative to the second subset of the sensor data based on a set of factors including frequency of change of a sensor value, sensor value differences relative to different states of the user, and whether a sensor value is determinative of one or more states of the user; and discarding, by the processor, the first subset of the sensor data or the second subset of the sensor data based on the determined information loss, where the first subset of the sensor data and the second subset of the sensor data are different and not mutually exclusive Aspect 3. The method of any of Aspects 1-2, further including determining, by the processor, whether a predetermined balance between the determined information loss and a power cost of receiving the sensor data from the plurality of inputs is satisfied; determining, by the processor, whether a user setting limits receipt of the sensor data from one or more of the plurality of inputs; and adjusting, by the processor, a wake-up cycle of one or more sensors corresponding to the first subset of the sensor data or the second subset of the sensor data based on the predetermined balance and the user setting.

Aspect 4. The methods of any of Aspects 1-3, further including selecting the first subset of the sensor data is performed randomly by activating a random subset of the plurality of inputs or selecting the second subset of the sensor data is performed randomly by de-activating a test input of the plurality of inputs; the first subset of the sensor data relates to the plurality of inputs; and the second subset of the sensor data relates to the plurality of inputs excluding a test input of the plurality of inputs.

Aspect 5. The methods of any of Aspects 1-4, where selecting the second subset of the sensor data comprises periodically de-activating a first input of the plurality of inputs thereby reducing a resolution of the sensor data from the first input.

Aspect 6. The methods of any of Aspects 1-5, further including where determining a state of the user includes matching, by the processor, the sensor data at the first-time instance with the state based on a state dictionary, wherein the state dictionary includes a set of valid states of user context.

Aspect 7. The methods of any of Aspects 1-6, where determining a state of the user includes determining, by the processor, whether the sensor data at the first-time instance matches a first state in a state dictionary, and one of: adding, by the processor, the sensor data to the state dictionary stored in memory as a first unknown state in response to determining that the sensor data at the first-time instance matches a first state in the state dictionary, or recording, by the processor, a count of the first state in a state table that records states of the user in a first given period of time.

Aspect 8. The methods of Aspect 7, where the first unknown state is added to the state dictionary stored in memory, and the method including identifying the first unknown state as a user specific state based on an occurrence count for the first unknown state within a second given period of time; requesting, via the UE, a user input to label the first unknown state; and recording the first unknown state as a labeled state in the state dictionary based on the user input.

Aspect 9. The methods of any of Aspects 7-8, further including recording, by the processor, a count of the first unknown state in the state table in response to determining that the sensor data during the first-time instance matches the first unknown state stored in the state dictionary.

Aspect 10. The methods of any of Aspects 7-9, further including updating the inference model in an on-device retraining performed by the UE, where the on-device retraining is based at least in part on the state dictionary including the first unknown state.

Aspect 11. The methods of any of Aspects 7-10, further including determining one or more inference weights associated with the at least one attribute of the user; transmitting only the one or more weights to a remote computing device to adjust the one or more weights based on related weights from related users, wherein users are related based at least on geolocation; receiving the adjusted one or more weights; and updating the inference model of the UE based on the adjusted one or more weights.

Aspect 12. The methods of any of Aspects 7-11, further including determining, by the processor, whether the first state is relevant to one or more attributes of the at least one attribute of the user; and removing, by the processor, the first state from the state dictionary based on the count of the first state in response to whether the first state is relevant to the one or more attributes.

Aspect 13. The methods of any of Aspects 1-12, further including training the inference model by: querying an artificial intelligence (AI) model to complete a user profile based on a set of user profile fields; querying the AI model to complete user activity in a given time period based on the completed user profile; querying the AI model to complete context logs of synthetic sensor data associated with the user activity; assembling the responses to the queries into a training dataset; and using the training dataset to derive weighting parameters associated with the inference model.

Aspect 14. The methods of any of Aspects 1-13, further including training the inference model based on the training dataset and the sensor data by one of: mixing the sensor data into the training dataset; upsampling the training dataset using the sensor data; or querying the AI model to fill gaps in the sensor data based on the user profile.

Aspect 15. The methods of any of Aspects 1-14, where storing in the memory the state of the user collected at the multiple time instances and the at least one attribute includes storing the state of the user collected at the multiple time instances and the at least one attribute in a personal knowledge graph that is accessible to applications that execute on the UE and that enables such applications to perform differently based on the at least one attribute of the user.

Aspect 16. A user equipment (UE) comprising a plurality of sensors configured to generate sensor data; a memory; and a processor configured with executable instructions to perform operations according to any of Aspects 1-15.

Aspect 17. A non-transitory computer-readable medium having stored thereon processor-executable instructions configured to cause a processor of a computing device to perform operations according to any of Aspects 1-15.

Aspect 18. An apparatus comprising one or more means for performing operations according to any of Aspects 1-15.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced smartphone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a user equipment (UE), comprising:

receiving, by a processor of the UE, sensor data associated with activity of a user from a plurality of inputs at a first-time instance;

determining, by the processor, a state of the user at the first-time instance based on the sensor data;

identifying, by the processor, at least one attribute of the user or the activity of the user based on the sensor data and the state of the user collected at multiple time instances including the first-time instance, wherein identifying the at least one attribute comprises using an inference model to receive selected sensor data as an input and to provide an output classifying the state of the user at the multiple time instances as an attribute of the user; and storing in memory the state of the user collected at the multiple time instances and the at least one attribute in a format that is accessible to applications that execute on the UE and that enables such applications to perform differently based on the at least one attribute of the user.

2. The method of claim 1, further comprising:

selecting, by the processor, a first subset of the sensor data and a second subset of the sensor data;

determining, by the processor, an information loss for the first subset of the sensor data relative to the second subset of the sensor data based on a set of factors including frequency of change of a sensor value, sensor value differences relative to different states of the user, and whether a sensor value is determinative of one or more states of the user; and discarding, by the processor, the first subset of the sensor data or the second subset of the sensor data based on the determined information loss, wherein the first subset of the sensor data and the second subset of the sensor data are different and not mutually exclusive.

3. The method of claim 2, further comprising:

determining, by the processor, whether a predetermined balance between the determined information loss and a power cost of receiving the sensor data from the plurality of inputs is satisfied;

determining, by the processor, whether a user setting limits receipt of the sensor data from one or more of the plurality of inputs; and adjusting, by the processor, a wake-up cycle of one or more sensors corresponding to the first subset of the sensor data or the second subset of the sensor data based on the predetermined balance and the user setting.

4. The method of claim 2, wherein:

selecting the first subset of the sensor data is performed randomly by activating a random subset of the plurality of inputs or selecting the second subset of the sensor data is performed randomly by de-activating a test input of the plurality of inputs;

the first subset of the sensor data relates to the plurality of inputs; and the second subset of the sensor data relates to the plurality of inputs excluding a test input of the plurality of inputs.

5. The method of claim 2, wherein selecting the second subset of the sensor data comprises periodically de-activating a first input of the plurality of inputs thereby reducing a resolution of the sensor data from the first input.

6. The method of claim 1, wherein determining a state of the user further comprises:

matching, by the processor, the sensor data at the first-time instance with the state based on a state dictionary, wherein the state dictionary includes a set of valid states of user context.

7. The method of claim 1, wherein determining a state of the user further comprises determining, by the processor, whether the sensor data at the first-time instance matches a first state in a state dictionary, and one of:

adding, by the processor, the sensor data to the state dictionary stored in memory as a first unknown state in response to determining that the sensor data at the first-time instance matches a first state in the state dictionary; or recording, by the processor, a count of the first state in a state table that records states of the user in a first given period of time.

8. The method of claim 7, wherein the first unknown state is added to the state dictionary stored in memory, the method further comprising:

identifying the first unknown state as a user specific state based on an occurrence count for the first unknown state within a second given period of time;

recording, by the processor, a count of the first unknown state in the state table in response to determining that the sensor data during the first-time instance matches the first unknown state stored in the state dictionary;

requesting, via the UE, a user input to label the first unknown state; and recording the first unknown state as a labeled state in the state dictionary based on the user input.

9. The method of claim 7, further comprising:

determining, by the processor, whether the first state is relevant to one or more attributes of the at least one attribute of the user; and removing, by the processor, the first state from the state dictionary based on the count of the first state in response to whether the first state is relevant to the one or more attributes.

10. The method of claim 7, further comprising:

updating the inference model in an on-device retraining performed by the UE, wherein the on-device retraining is based at least in part on the state dictionary including the first unknown state.

11. The method of claim 7, further comprising:

determining one or more inference weights associated with the at least one attribute of the user;

transmitting only the one or more inference weights to a remote computing device to adjust the one or more inference weights based on related weights from related users, wherein users are related based at least on geolocation;

receiving one or more adjusted inference weights; and updating the inference model based on the one or more adjusted inference weights.

12. The method of claim 1, further comprising training the inference model by:

querying an artificial intelligence (AI) model to complete a user profile based on a set of user profile fields;

querying the AI model to complete user activity in a given time period based on the completed user profile;

querying the AI model to complete context logs of synthetic sensor data associated with the user activity;

assembling responses to the queries into a training dataset; and using the training dataset to derive weighting parameters associated with the inference model.

13. The method of claim 12, further comprising:

training the inference model based on the training dataset and the sensor data by one of:

mixing the sensor data into the training dataset;

upsampling the training dataset using the sensor data; or querying the AI model to fill gaps in the sensor data based on the user profile.

14. The method of claim 1, wherein storing in the memory the state of the user collected at the multiple time instances and the at least one attribute further comprises storing the state of the user collected at the multiple time instances and the at least one attribute in a personal knowledge graph that is accessible to applications that execute on the UE and that enables such applications to perform differently based on the at least one attribute of the user.

15. A user equipment (UE), comprising:

a plurality of sensors configured to generate sensor data;

a memory; and a processor configured with executable instructions to:

receive sensor data associated with activity of a user from a plurality of inputs of the plurality of sensors at a first-time instance;

determine a state of the user at the first-time instance based on the sensor data;

identify at least one attribute of the user or the activity of the user based on the sensor data and the state of the user collected at multiple time instances including the first-time instance, wherein identifying the at least one attribute comprises using an inference model to receive selected sensor data as an input and to provide an output classifying the state of the user at the multiple time instances as an attribute of the user; and store in the memory the state of the user collected at the multiple time instances and the at least one attribute in a format that is accessible to applications that execute on the UE and that enables such applications to perform differently based on the at least one attribute of the user.

16. The UE of claim 15, wherein the processor is further configured to:

select a first subset of the sensor data and a second subset of the sensor data;

determine an information loss for the first subset of the sensor data relative to the second subset of the sensor data based on a set of factors including frequency of change of a sensor value, sensor value differences relative to different states of the user, and whether a sensor value is determinative of one or more states of the user;

discard the first subset of the sensor data or the second subset of the sensor data based on the determined information loss; and select the first subset of the sensor data by randomly by activating a random subset of the plurality of inputs or selecting the second subset of the sensor data is performed randomly by de-activating a test input of the plurality of inputs, wherein the first subset of the sensor data relates to the plurality of inputs, wherein the second subset of the sensor data relates to the plurality of inputs excluding a test input of the plurality of inputs, and wherein the first subset of the sensor data and the second subset of the sensor data are different and not mutually exclusive.

17. The UE of claim 16, wherein the processor is further configured to:

determine whether a predetermined balance between the determined information loss and a power cost of receiving the sensor data from the plurality of inputs is satisfied;

determine whether a user setting limits receipt of the sensor data from one or more of the plurality of inputs; and adjust a wake-up cycle of one or more sensors corresponding to the first subset of the sensor data or the second subset of the sensor data based on the predetermined balance and the user setting.

18. The UE of claim 15, wherein the processor is further configured to:

determine a state of the user by determining whether the sensor data at the first-time instance matches a first state in a state dictionary; and perform one of:

adding the sensor data to the state dictionary stored in memory as a first unknown state in response to determining that the sensor data at the first-time instance matches a first state in the state dictionary;

identifying the first unknown state as a user specific state based on an occurrence count for the first unknown state within a second given period of time;

requesting, via the UE, a user input to label the first unknown state; and recording the first unknown state as a labeled state in the state dictionary based on the user input; or recording a count of the first state in a state table that records states of the user in a first given period of time.

19. The UE of claim 15, wherein the processor is further configured to train the inference model by:

querying an artificial intelligence (AI) model to complete a user profile based on a set of user profile fields;

querying the AI model to complete user activity in a given time period based on the completed user profile;

querying the AI model to complete context logs of synthetic sensor data associated with the user activity;

assembling responses to the queries into a training dataset;

deriving, from the training dataset, weighting parameters associated with the inference model; and training the inference model based on the training dataset and the sensor data by one of:

mixing the sensor data into the training dataset;

upsampling the training dataset using the sensor data; or querying the AI model to fill gaps in the sensor data based on the user profile.

20. A non-transitory computer-readable medium having stored thereon processor-executable instructions configured to cause a processor of a computing device to perform operations comprising:

receiving sensor data associated with activity of a user from a plurality of inputs at a first-time instance;

determining a state of the user at the first-time instance based on the sensor data;

identifying at least one attribute of the user or the activity of the user based on the sensor data and the state of the user collected at multiple time instances including the first-time instance, wherein identifying the at least one attribute comprises using an inference model to receive selected sensor data as an input and to provide an output classifying the state of the user at the multiple time instances as an attribute of the user; and storing in memory the state of the user collected at the multiple time instances and the at least one attribute in a format that is accessible to applications that execute on a User Equipment (UE) and that enables such applications to perform differently based on the at least one attribute of the user.

* * * * *